United States Patent
Marten et al.

(10) Patent No.: US 11,849,171 B2
(45) Date of Patent: *Dec. 19, 2023

(54) DEEPFAKE CONTENT WATCH PARTIES

(71) Applicant: DISH Network L.L.C., Englewood, CO (US)

(72) Inventors: Neil Marten, Lakewood, CO (US); Rebecca Albinola, Lakewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/543,925

(22) Filed: Dec. 7, 2021

(65) Prior Publication Data
US 2023/0179823 A1    Jun. 8, 2023

(51) Int. Cl.
*H04N 7/10* (2006.01)
*H04N 7/025* (2006.01)
(Continued)

(52) U.S. Cl.
CPC ... *H04N 21/43074* (2020.08); *H04N 21/2187* (2013.01); *H04N 21/242* (2013.01);
(Continued)

(58) Field of Classification Search
CPC ......... H04N 21/43074; H04N 21/2187; H04N 21/242; H04N 21/47217; H04N 21/6543; H04N 21/8133; H04N 21/8456
See application file for complete search history.

(56) References Cited

U.S. PATENT DOCUMENTS 6,081,830 A    6/2000 Schindler
6,237,025 B1    5/2001 Tudwig et al.
(Continued)

FOREIGN PATENT DOCUMENTS

CN    103290360 B    3/2016
CN    110430457 A    11/2019

OTHER PUBLICATIONS

U.S. Appl. No. 15/788,058, Request for Continued Examination, Amendment and IDS, dated Nov. 3, 2022.
(Continued)

*Primary Examiner* — Gigi L Dubasky
(74) *Attorney, Agent, or Firm* — Wash Park IP Ltd.; John T. Kennedy

(57) ABSTRACT

Devices, systems and process for facilitating a Deepfake content watch party (DFWP) are disclosed. A system includes server, Deepfake presenter user device (DFPUD), Deepfake user device (DFUD), and content provider. The DFPUD instructs a content capture device (CCD) to capture a Deepfake Reaction (DFR) by a DFPUD user; receives the DFR from the CCD; and communicates the DFR to the server. The content provider provides Deepfake Content (DFC) segments, which include a Deepfake Target (DFT), and Deepfake Augmented Content (DFAC), which identifies a Deepfake model for the DFT. The server, based on the DFR, generates a Deepfake Subject (DFS), identifying a DFPUD user characteristic, generates Deepfake secondary content (DFSC), and communicates DFSC to the DFUD. The DFUD integrates the DFSC with the DFC to facilitate presentation of DFRs in a DFWP.

19 Claims, 7 Drawing Sheets

(51) Int. Cl.
*H04N 21/43* (2011.01)
*H04N 21/242* (2011.01)
*H04N 21/81* (2011.01)
*H04N 21/472* (2011.01)
*H04N 21/2187* (2011.01)
*H04N 21/845* (2011.01)
*H04N 21/6543* (2011.01)

(52) U.S. Cl.
CPC ... *H04N 21/47217* (2013.01); *H04N 21/6543* (2013.01); *H04N 21/8133* (2013.01); *H04N 21/8456* (2013.01)

(56) References Cited

U.S. PATENT DOCUMENTS

| | | |
|---|---|---|
| 6,256,663 B1 | 7/2001 | Davis |
| 6,392,664 B1 | 5/2002 | White et al. |
| 6,519,771 B1 | 2/2003 | Zenith |
| 6,643,291 B1 | 11/2003 | Yoshihara et al. |
| 6,646,673 B2 | 11/2003 | Caviedes et al. |
| 6,754,904 B1 | 6/2004 | Cooper et al. |
| 7,143,428 B1 | 11/2006 | Bruck et al. |
| 8,015,306 B2 | 9/2011 | Bowman |
| 8,046,411 B2 | 10/2011 | Hayashi et al. |
| 8,223,185 B2 | 7/2012 | Gratton et al. |
| 8,316,400 B1 | 11/2012 | Kravets |
| 9,015,306 B2 | 4/2015 | Dupre et al. |
| 9,226,011 B2 | 12/2015 | Francisco |
| 9,252,950 B2 | 2/2016 | Caspi |
| 9,378,474 B1 | 6/2016 | Story, Jr. et al. |
| 9,471,809 B2 | 10/2016 | Garrett et al. |
| 9,544,624 B2 | 1/2017 | VanDuyn et al. |
| 9,654,817 B2 | 5/2017 | Li et al. |
| 10,135,887 B1 | 11/2018 | Esser et al. |
| 10,187,690 B1 | 1/2019 | Garcia et al. |
| 10,237,587 B2 | 3/2019 | Zanabria et al. |
| 10,536,741 B1 | 1/2020 | Madison et al. |
| 10,575,042 B2 | 2/2020 | Rennison et al. |
| 10,735,825 B1 | 8/2020 | Comito et al. |
| 10,757,366 B1 | 8/2020 | Kwatra et al. |
| 10,757,467 B1 | 8/2020 | Katz et al. |
| 10,762,474 B2 | 9/2020 | Frank et al. |
| 10,819,758 B1 | 10/2020 | Krutsch et al. |
| 10,939,148 B2 | 3/2021 | Sun |
| 11,019,113 B2 | 5/2021 | Kurata et al. |
| 11,051,059 B2 | 6/2021 | Dodson et al. |
| 11,082,467 B1 | 8/2021 | Hartnett et al. |
| 11,128,916 B2 | 9/2021 | Mayhew et al. |
| 11,166,065 B1 | 11/2021 | Camargo et al. |
| 11,303,947 B2 | 4/2022 | Bertolami et al. |
| 11,477,516 B2 | 10/2022 | Yoden |
| 11,502,864 B2 | 11/2022 | Moorefield et al. |
| 11,509,726 B2 | 11/2022 | Alsina et al. |
| 11,553,159 B1* | 1/2023 | Rothschild ............. H04N 7/152 |
| 11,588,869 B2 | 2/2023 | Gratton et al. |
| 11,606,597 B2 | 3/2023 | Iyer et al. |
| 11,762,917 B2 | 9/2023 | Frank et al. |
| 2002/0067909 A1 | 6/2002 | Iivonen |
| 2003/0009766 A1 | 1/2003 | Marolda |
| 2003/0097655 A1 | 5/2003 | Novak |
| 2003/0229900 A1 | 12/2003 | Reisman |
| 2004/0154040 A1 | 8/2004 | Ellis |
| 2004/0205811 A1 | 10/2004 | Grandy et al. |
| 2005/0204387 A1 | 9/2005 | Knudson et al. |
| 2005/0262542 A1 | 11/2005 | DeWeese et al. |
| 2006/0101022 A1 | 5/2006 | Yu et al. |
| 2006/0149850 A1 | 7/2006 | Bowman |
| 2006/0161621 A1 | 7/2006 | Rosenberg |
| 2006/0174312 A1 | 8/2006 | Ducheneaut et al. |
| 2006/0236352 A1 | 10/2006 | Scott |
| 2006/0271960 A1 | 11/2006 | Jacoby et al. |
| 2007/0157281 A1 | 7/2007 | Ellis et al. |
| 2007/0229651 A1 | 10/2007 | Nakajima |
| 2007/0283380 A1 | 12/2007 | Aoki et al. |
| 2008/0037785 A1 | 2/2008 | Gantman et al. |
| 2008/0163285 A1 | 7/2008 | Tanaka et al. |
| 2009/0063983 A1 | 3/2009 | Amidon et al. |
| 2009/0089840 A1 | 4/2009 | Shusman |
| 2009/0167839 A1 | 7/2009 | Ottmar |
| 2009/0205008 A1 | 8/2009 | Wollmershauser et al. |
| 2009/0319885 A1 | 12/2009 | Amento et al. |
| 2009/0327428 A1 | 12/2009 | Ramanathan et al. |
| 2010/0066804 A1 | 3/2010 | Shoemake et al. |
| 2010/0281108 A1 | 11/2010 | Cohen |
| 2010/0306671 A1 | 12/2010 | Mattingly et al. |
| 2011/0016172 A1 | 1/2011 | Shah |
| 2011/0069940 A1 | 3/2011 | Shimy et al. |
| 2011/0154417 A1 | 6/2011 | Civanlar et al. |
| 2011/0219307 A1 | 9/2011 | Mate et al. |
| 2011/0246908 A1 | 10/2011 | Akram et al. |
| 2012/0131110 A1 | 5/2012 | Buyukkoc et al. |
| 2012/0151345 A1 | 6/2012 | McClements, IV |
| 2012/0216300 A1 | 8/2012 | Vivolo et al. |
| 2012/0218262 A1* | 8/2012 | Yomdin ................. G06T 13/40 345/473 |
| 2012/0246679 A1 | 9/2012 | Chen |
| 2012/0296972 A1 | 11/2012 | Backer |
| 2013/0016955 A1 | 1/2013 | Pejaver |
| 2013/0031192 A1 | 1/2013 | Caspi |
| 2013/0058632 A1 | 3/2013 | Jackson |
| 2013/0103814 A1 | 4/2013 | Carrasco et al. |
| 2013/0173765 A1 | 7/2013 | Korbecki |
| 2014/0068692 A1 | 3/2014 | Archibong et al. |
| 2014/0071344 A1 | 3/2014 | Francisco |
| 2014/0096167 A1 | 4/2014 | Lang et al. |
| 2014/0150002 A1 | 5/2014 | Hough et al. |
| 2014/0195675 A1 | 7/2014 | Silver |
| 2014/0205261 A1 | 7/2014 | Courtemanche |
| 2014/0269757 A1 | 9/2014 | Park et al. |
| 2014/0325557 A1 | 10/2014 | Evans et al. |
| 2015/0052571 A1 | 2/2015 | Stokking et al. |
| 2015/0106360 A1 | 4/2015 | Cao et al. |
| 2015/0172338 A1 | 6/2015 | Moran et al. |
| 2015/0215352 A1 | 7/2015 | Wong et al. |
| 2015/0230004 A1 | 8/2015 | VanDuyn et al. |
| 2015/0245106 A1 | 8/2015 | Tian |
| 2015/0327024 A1 | 11/2015 | Yang et al. |
| 2016/0006981 A1 | 1/2016 | Bauman et al. |
| 2016/0021153 A1 | 1/2016 | Hull et al. |
| 2016/0044622 A1 | 2/2016 | Crowe et al. |
| 2016/0050160 A1 | 2/2016 | Li et al. |
| 2016/0182928 A1 | 6/2016 | Francisco |
| 2016/0241652 A1 | 8/2016 | Frazier et al. |
| 2016/0255041 A1 | 9/2016 | Lew et al. |
| 2016/0294894 A1 | 10/2016 | Miller |
| 2016/0366203 A1 | 12/2016 | Blong et al. |
| 2017/0006322 A1 | 1/2017 | Dury et al. |
| 2017/0093769 A1 | 3/2017 | Lind et al. |
| 2017/0103664 A1 | 4/2017 | Wong et al. |
| 2017/0264920 A1 | 9/2017 | Mickelsen |
| 2017/0312626 A1 | 11/2017 | Colenbrander |
| 2017/0346926 A1 | 11/2017 | Charters et al. |
| 2018/0035136 A1 | 2/2018 | Crowe |
| 2018/0167427 A1 | 6/2018 | Kedenburg, III |
| 2018/0192000 A1 | 7/2018 | Mercredi et al. |
| 2018/0288467 A1 | 10/2018 | Holmberg et al. |
| 2018/0316939 A1 | 11/2018 | Todd |
| 2018/0330756 A1* | 11/2018 | MacDonald .......... G06F 16/951 |
| 2018/0365232 A1 | 12/2018 | Lewis et al. |
| 2019/0124159 A1 | 4/2019 | Alsina et al. |
| 2019/0147841 A1* | 5/2019 | Zatepyakin ............ G10H 1/368 352/12 |
| 2019/0155934 A1 | 5/2019 | Delaney et al. |
| 2019/0179610 A1 | 6/2019 | Aiken et al. |
| 2019/0200054 A1 | 6/2019 | Dharmaji |
| 2019/0253742 A1 | 8/2019 | Garten et al. |
| 2019/0321720 A1 | 10/2019 | Nomura et al. |
| 2020/0029117 A1 | 1/2020 | Kalva et al. |
| 2020/0053312 A1 | 2/2020 | Mukherjee et al. |
| 2020/0112753 A1 | 4/2020 | Stockhammer et al. |
| 2020/0275149 A1 | 8/2020 | Su et al. |
| 2021/0001236 A1 | 1/2021 | Srinivasan |
| 2021/0006864 A1 | 1/2021 | Xu et al. |

(56) References Cited

U.S. PATENT DOCUMENTS

| | | |
|---|---|---|
| 2021/0035559 A1 | 2/2021 | Xu |
| 2021/0037295 A1 | 2/2021 | Strickland |
| 2021/0051034 A1 | 2/2021 | Jonas et al. |
| 2021/0321159 A1 | 10/2021 | Aggarwal et al. |
| 2022/0029825 A1 | 1/2022 | Uhr et al. |
| 2022/0040816 A1 | 2/2022 | Eckel et al. |
| 2022/0066621 A1 | 3/2022 | Appelbaum et al. |
| 2022/0070524 A1* | 3/2022 | Iyer ............... H04N 21/242 |
| 2022/0103873 A1 | 3/2022 | Yoshida et al. |
| 2022/0132214 A1 | 4/2022 | Felman |
| 2022/0141500 A1 | 5/2022 | Du |
| 2022/0166815 A1 | 5/2022 | Gratton et al. |
| 2022/0174357 A1 | 6/2022 | Zavesky et al. |
| 2022/0224659 A1 | 7/2022 | Ghazzal |
| 2022/0256231 A1 | 8/2022 | Eniwumide |
| 2022/0377413 A1 | 11/2022 | Lidaka et al. |
| 2022/0408161 A1 | 12/2022 | Garten |
| 2023/0147705 A1 | 5/2023 | Huertas et al. |

OTHER PUBLICATIONS

U.S. Appl. No. 15/788,058, Notice of Allowance dated Nov. 30, 2022.
U.S. Appl. No. 16/801,277, Response to non-final Office Action, dated Nov. 28, 2022.
U.S. Appl. No. 17/376,459, Final Office Action, dated Dec. 1, 2022.
U.S. Appl. No. 17/376,459, Response to Non-final Office Action, dated Oct. 11, 2022.
U.S. Appl. No. 17/543,852, Non-Final Office Action, dated Dec. 5, 2022.
U.S. Appl. No. 17/087,815, filed Nov. 3, 2020.
U.S. Appl. No. 15/788,058, filed Oct. 19, 2017.
U.S. Appl. No. 15/788,058, Prosecution History through Jul. 19, 2022.
U.S. Appl. No. 16/706,686, filed Dec. 7, 2019, prosecution history.
U.S. Appl. No. 16/706,764, Issue Fee Paid, Jun. 15, 2022.
U.S. Appl. No. 16/706,764, RCE, Jul. 19, 2022.
U.S. Appl. No. 17/336,416, Non-final Office Action, dated Jun. 16, 2021.
U.S. Appl. No. 17/376,459, RCE and Response to Final Office Action, dated Jul. 5, 2022.
U.S. Appl. No. 17/840,966, Application as filed, Jun. 15, 2022.
PCT/IB2021/057835, Int'l Search Report and Written Opinion, dated Jan. 27, 2022.
U.S. Appl. No. 17/087,815, Non-Final Office Action, dated Feb. 24, 2022.
U.S. Appl. No. 17/376,459, Response to Non-final Office Action, dated Mar. 5, 2022.
U.S. Appl. No. 17/376,459, Non-Final Office Action, dated Dec. 17, 2021.
U.S. Appl. No. 15/788,058, NTC Appeal with Pre-Appeal Brief Conference Request, Sep. 7, 2022.
U.S. Appl. No. 16/706,764, NTC Allowance, Sep. 8, 2022.
U.S. Appl. No. 16/801,277, Non-Final Office Action, dated Aug. 30, 2022.
U.S. Appl. No. 17/087,815, Notice of Allowability dated Sep. 9, 2022.
U.S. Appl. No. 17/087,815, Notice of Allowance dated Sep. 1, 2022.
U.S. Appl. No. 17/336,416, Response to Non-final Office Action, dated Sep. 12, 2022.
U.S. Appl. No. 17/376,459, Non-final Office Action, dated Jul. 29, 2022.
U.S. Appl. No. 17/891,939, Application Filed, Aug. 19, 2022.
U.S. Appl. No. 17/543,925, filed Dec. 7, 2021, Neil Marten.
"be anyone and reface anything" - downloaded from the Internet on Nov. 3, 2021 from https://hey.reface.ai/.
A. Colaco, I. Kim and C. Schmandt, "Back Talk: An auditory environment for sociable television viewing," 2011 IEEE Consumer Communications and Networking Conference (CCNC), 2011, pp. 352-356, doi: 10.1109/CCNC.2011.5766489. (Year: 2011).

ATSC Standard: ATSC 3.0 System, Doc. A/300:2019, Sep. 17, 2019.
DeepFace Lab for Windows, downloaded from the Internet on Nov. 3, 2021 from https://deepfacelab.en.softonic.com/.
Faceswap, downloaded from the Internet on Nov. 3, 2021 from https://faceswap.dev/.
Family Fun with Deepfakes . . . , downloaded from the Internet on Oct. 23, 2021, from https://towardsdatascience.com/family-fun-with-deepfakes-or-how-i-got-my-wife-onto-the tonight show-a4554775c011.
PCT/IB2021/057835, Invitation to pay Additional Fees and Preliminary International Search Results.
U.S. Appl. No. 16/706,686, Non-Final Office Action, dated May 12, 2021.
U.S. Appl. No. 16/706,764, Non-Final Office Action, dated Jun. 10, 2021.
U.S. Appl. No. 16/706,764, Application as filed, Dec. 8, 2019.
U.S. Appl. No. 16/706,764, Non-Final Office Action Response, dated Sep. 7, 2021.
U.S. Appl. No. 16/801,277, Application as filed, Feb. 26, 2020.
U.S. Appl. No. 17/087,815, Application as filed, Nov. 3, 2020.
U.S. Appl. No. 17/336,416, Application as filed, Jun. 2, 2021.
U.S. Appl. No. 17/376,459, Application as filed, Jul. 15, 2021.
U.S. Appl. No. 17/543,852, Application as filed, Dec. 7, 2021.
U.S. Appl. No. 17/543,886, Application as filed, Dec. 7, 2021.
U.S. Appl. No. 16/706,764, Notice of Allowance, dated Mar. 17, 2022.
U.S. Appl. No. 17/087,815, Response to Non-Final Office Action, dated May 23, 2022.
U.S. Appl. No. 17/376,459, Final Office Action, dated May 2, 2022.
U.S. Appl. No. 16/706,764, filed Dec. 8, 2019.
U.S. Appl. No. 16/706,686, Application as filed, Dec. 7, 2019.
U.S. Appl. No. 16/706,764, Notice of Allowability, dated May 11, 2023.
U.S. Appl. No. 16/801,277, RCE and response to Final Office Action, dated Mar. 21, 2023.
U.S. Appl. No. 17/336,416, RCE and Response to Final Office Action, dated Apr. 4, 2023.
U.S. Appl. No. 17/376,459, Notice of Allowance, dated Apr. 24, 2023.
U.S. Appl. No. 17/376,459, Response to Final Office Action, dated Mar. 29, 2023.
U.S. Appl. No. 17/543,852, Response to Non-Final Office Action, dated Apr. 3, 2023.
U.S. Appl. No. 17/543,886, Response to Non-Final Office Action, dated Apr. 5, 2023.
U.S. Appl. No. 18/314,987, Application as filed May 10, 2023.
M. 0. van Deventer, H. Stokking, M. Hammond, J. Le Feuvre and P. Cesar, "Standards for multi-stream and multi-device media synchronization," in IEEE Communications Magazine, vol. 54, No. 3, pp. 16-21, Mar. 2016, doi: 10.1109/MCOM.2016.7432166. (Year: 2016).
U.S. Appl. No. 18/094,369, Application as filed, Jan. 8, 2023.
U.S. Appl. No. 16/706,764, Prosecution Reopened, Jan. 4, 2023.
U.S. Appl. No. 16/801,277, Final Office Action, datd Dec. 23, 2022.
U.S. Appl. No. 17/336,416, Final Office Action, dated Jan. 9, 2022.
U.S. Appl. No. 17/543,886, Non-Final Office Action, dated Dec. 19, 2022.
U.S. Appl. No. 17/543,852, Final Office Action, dated May 26, 2022.
U.S. Appl. No. 17/543,886, Final Office Action, dated May 25, 2023.
U.S. Appl. No. 17/891,939, Examiner Interview Summary, dated Jun. 8, 2023.
U.S. Appl. No. 17/891,939, Amendment and Examiner Initiated Interview Summary, dated May 31, 2023.
U.S. Appl. No. 17/891,939, Notice of Allowance, dated Jun. 8, 2023.
U.S. Appl. No. 18/094,369, Non-Final Office Action, dated Jun. 8, 2023.
U.S. Appl. No. 16/801,277, Notice of Allowance & Interview Summary, dated Jul. 12, 2023.

(56) References Cited

OTHER PUBLICATIONS

U.S. Appl. No. 16/801,277, Supplemental Amendment & Interview Summary, dated Jun. 27, 2023.
U.S. Appl. No. 18/222,453, Continuation application as filed, Jul. 16, 2023.
U.S. Appl. No. 17/376,459, filed Jul. 15, 2021.
U.S. Appl. No. 15/788,058, filed Oct. 19, 2017, (Allowed).
U.S. Appl. No. 16/706,764, filed Dec. 8, 2019, (Allowed).
U.S. Appl. No. 17/087,815, filed Nov. 3, 2020, (Allowed).
U.S. Appl. No. 17/336,416, Non-Final Office Action, dated Jul. 28, 2023.
U.S. Appl. No. 17/543,852, RCE and Response to Non-Final Office Action, dated Aug. 22, 2023.
U.S. Appl. No. 17/543,886, RCE and Response to Final Office Action, dated Aug. 21, 2023.
U.S. Appl. No. 18/094,369, Response to non-final Office Action with Terrminal Disclaimer, dated Aug. 22, 2023.
U.S. Appl. No. 18/363,897, Application as filed Aug. 2, 2023.
U.S. Appl. No. 17/840,966, filed Jun. 15, 2022.
U.S. Appl. No. 16/801,277, filed Feb. 6, 2020.
U.S. Appl. No. 18/484,241, filed Oct. 10, 2023.
U.S. Appl. No. 18/094,369, filed Jan. 8, 2023.
U.S. Appl. No. 18/222,453, filed Jul. 16, 2023.
U.S. Appl. No. 17/336,416, filed Jun. 2, 2021.
U.S. Appl. No. 17/543,852, filed Dec. 7, 2021.
U.S. Appl. No. 17/543,886, filed Dec. 7, 2021.
U.S. Appl. No. 17/891,939, filed Aug. 19, 2022.
U.S. Appl. No. 18/363,897, filed Aug. 22, 2023.
U.S. Appl. No. 18/314,987, filed May 10, 2023.
U.S. Appl. No. 17/543,852, Notice of Allowance, dated Sep. 8, 2023.
U.S. Appl. No. 17/543,886, non-final Office Action, dated Sep. 14, 2023.
U.S. Appl. No. 18/314,987, Non-Final Office Action, dated Sep. 13, 2023.
U.S. Appl. No. 18/484,241, Application filed, dated Oct. 10, 2023.
U.S. Appl. No. 17/336,416, Non-Final Office Action Response, dated Oct. 23, 2023.
U.S. Appl. No. 17/840,966, Non-Final Office Action, dated Oct. 19, 2023.

* cited by examiner

DEEPFAKE CONTENT WATCH PARTIES

CROSS-REFERENCE TO RELATED APPLICATIONS

The present application is related to U.S. patent application Ser. No. 17/543,886, co-filed herewith on Dec. 7, 2021, in the name of inventor Neil Marten and Rebecca Albinola, entitled "Karaoke Content Watch Parties," the entire contents of such application are herein incorporated by reference.

The present application is also related to U.S. patent application Ser. No. 17/543,852, co-filed herewith on Dec. 7, 2021, in the name of inventors Ross Alan Drennan, Grant Alexander Drennan, and Jesus Flores Guerra, entitled "Cell Phone Content Watch Parties," the entire contents of such application are incorporated herein by reference.

TECHNICAL FIELD

The technology described herein generally relates to devices, systems, and processes for facilitating sharing of audio sounds and/or video images of participants in a watch party.

BACKGROUND

Today, various systems, methods, and devices have been described which enable multiple, physically remote persons to be presented with content and user reactions thereto, at substantially the same time. Multiple implementations of such systems, etc. are described, for example, in U.S. patent application Ser. No. 16/801,277, which was filed on 26 Feb. 2020, in the name of inventor Neil Marten, and is entitled "Devices, Systems and Processes for Facilitating Watch Parties" (the "'277 App."); which is incorporated herein by reference in its entirety. The '277 App. describes, in part, various implementations of watch parties including an implementation where a camera may be focused upon a first user at a first location and images captured by such camera may be then provided for viewing by other users at other locations; such other locations being remote from the location of the first user.

U.S. patent application Ser. No. 16/706,686, which was filed on 7 Dec. 2019, in the name of inventor Ramgopal Madduluri, and is entitled "Devices, Systems and Processes for Providing Engaging Content Environments" (the "'686 App."); the entire contents of which are incorporated herein by reference in its entirety. The '686 App. describes, in part, various implementations by which a first user may share their reactions to content, including visible reactions, with other remote users participating in a "user circle" (as further described in the '686 App.). The '686 App. also describe uses of cameras in a user device or otherwise to capture a user's reactions to content, and for sharing such reactions to others.

U.S. patent application Ser. No. 17/087,815, which was filed on 3 Nov. 2020, in the name of inventors Satish Balasubramanian Iyer, et al., and is entitled "Devices, Systems and Processes for Facilitating Live and Recorded Content Watch Parties" (the "'815 App."); which is incorporated herein by reference in its entirety. The '815 App. describes various implementations for facilitating watch parties and the substantially simultaneous presentation of video capturing a first user's reactions to content with other remote users.

U.S. patent application Ser. No. 17/376,459, which was filed on 15 Jul. 2021, in the name of inventor Neil Marten, and is entitled "Interactive Media Events" (the "'459 App."); which is incorporated herein by reference in its entirety. The '459 App. describes various implementations for facilitating interactive media events.

U.S. patent application Ser. No. 17/336,416, which was filed on 2 Jun. 2021, in the name of inventor Neil Marten, and is entitled "Consolidated Watch Parties" (the "'416 App."); which is incorporated herein by reference in its entirety. The '416 App. describes various implementation for facilitating later arising consolidated presentations of watch parties and interactive media events.

Various needs exist for improving watch parties, interactive media events, consolidated watch parties and the like (collectively, a "watch party") including, facilitating the use and/or integration of secondary content into primary content. For example, implementations facilitating the capturing and integration of user generated audio streams, video streams, or the like into a primary content stream are needed.

An integration of multiple audio and/or video feeds generated at one or more user locations, such as at a first home, into a primary content stream and provided to other remote watch party users is needed. Needs also exist for watch party users to be able to select which secondary content stream are to be presented in addition to and/or replacement of a primary content stream during a watch party. The various implementations of the present disclosure address these and other needs.

SUMMARY

Various implementations are described of devices, systems, and processes for facilitating Deepfake content watch parties.

A system of one or more computers can be configured to perform particular operations or actions by virtue of having software, firmware, hardware, or a combination of them installed on the system that in operation causes or cause the system to perform the actions.

One or more computer programs can be configured to perform particular operations or actions by virtue of including instructions that, when executed by data processing apparatus, cause the apparatus to perform the actions.

One general aspect of a system may include a sync server; a deepfake presenter user device (DFPUD) communicatively coupled to the sync server; where the DFPUD executes non-transient DFPUD computer instructions which instruct the DFPUD to perform DFPUD operations may include: instructing a content capture device (CCD), communicatively coupled to the DFPUD, to capture a deepfake reaction (DFR) by a DFPUD user.

The system may include receiving the DFR from the CCD; and communicating the DFR to the sync server. The system may include a Deepfake User Device (DFUD) communicatively coupled to the sync server; a content provider, communicatively coupled to the DFPUD and the DFUD; where the content provider provides deepfake content (DFC) to the DFPUD and the DFUD and deepfake augmented content (DFAC) to the sync server; and where the DFC includes a DFC segment that includes a deepfake target (DFT); where the DFAC includes secondary content which identifies the DFT by a deepfake model.

The sync server may execute non-transient server computer instructions which instruct the sync server to perform sync server operations which may include: receiving the DFR from the DFPUD; generating a deepfake subject (DFS)

for the DFPUD user; where the DFS identifies at least one characteristic of the DFPUD user; generating from the DFR, using the DFS, deepfake secondary content (DFSC); and communicating the DFSC to the DFUD. The system may include where the DFUD integrates the DFSC with the DFC to facilitate presentation of DFRs in a DFWP. Other embodiments of this aspect include corresponding computer systems, apparatus, and computer programs recorded on one or more computer storage devices, each configured to perform the actions of the methods.

Implementations may include one or more of the following features. The system where the sync server operations further may include: receiving deepfake synchronization information (DFSI); and communicating the DFSI to the DFUD; and where the DFSI facilitates synchronized presentation, by the DFUD, of the DFSC with the DFC segment.

The DFPUD operations further may include: generating deepfake synchronization information (DFSI); and communicating the DFSI to the sync server with the DFR. The DFSI facilitates synchronization of the DFR with the DFC segment.

The server operations further may include: communicating the DFAC to the DFPUD.

The DFPUD operations further may include: instructing the CCD to capture the DFR by the DFPUD user based upon the DFAC; and where the DFSI further facilitates synchronization, by the sync server, of the DFR with the DFAC and the DFC segment.

The DFPUD operations further may include: instructing the CCD to capture the DFR while presenting the DFAC corresponding to the DFC segment to the DFPUD user.

The content provider further may include a content distribution network including a host content node and a client content node; where host content node provides a first instance of the DFC segment to the DFPUD; where the client content node provides a second instance of the DFC segment to the DFUD; and where the sync server operations further may include: instructing the DFUD to adjust presentation of the second instance of the DFC segment based upon content timing information associated with when the DFPUD receives the first instance of the DFC segment. The DFC may include live content.

The sync server operations further may include: receiving deepfake synchronization information (DFSI); and communicating the DFSI to the DFUD; where the DFSI includes: a content timing information primary (CTI-P) identifying when the first instance of the DFC segment is received by the DFPUD; a content timing information DFR (CTI-DFR) identifying when the DFPUD receives the DFR from the CCD.

The sync server operations further may include: instructing the DFUD to adjust presentation of the second instance of the DFC segment based the latter of the CTI-P and the CTI-DFR. The adjusting of the presentation of the second instance of the DFC segment may include applying, by the DFUD, a trick-play mode operation to first instance of the DFC segment. The trick-play mode operation may include one of a pause and a seek operation.

The sync server executes non-transient second server computer instructions which instruct the sync server to perform conferencing operations which may include: determining a type of content provided by the DFR. The type of the content provided by the DFR is at least one of an audible signal and a visible signal. The conferencing operations further may include: identifying a user associated with the DFR; and prioritizing the DFR based on the identification of the user. The conferencing operations further may include: instructing the DFUD to present the DFSC during the DFWP. Implementations of the described techniques may include hardware, a method or process, or computer software on a computer-accessible medium.

One general aspect includes the system where the conferencing operations further may include: instructing the DFUD to not present the DFSC during the DFWP. Other embodiments of this aspect include corresponding computer systems, apparatus, and computer programs recorded on one or more computer storage devices, each configured to perform the actions of the methods.

One general aspect includes a method for facilitating deepfake watch parties (DFWPs). The method may include designating a first user device as a deepfake presenter user device (DFPUD); designating a second user device as a deepfake user device (DFUD), communicatively coupling the DFPUD and the DFUD with a sync server, receiving a first instance of a deepfake content (DFC) segment by the DFPUD, receiving a second instance of the DFC segment by the DFUD, determining a content timing information primary (CTI-P), where the CTI-P identifies when the first instance of the DFC segment is received by the DFPUD.

The method may include receiving a deepfake augmented content (DFAC) segment by the sync server; where the DFAC segment is associated with the DFC segment and identifies at least one deepfake target (DFT).

The method may include receiving a deepfake reaction (DFR) by the DFPUD; where the DFR is a reaction by a DFPUD user to a presentation of the DFC segment to the DFPUD user.

The method may include determining a content timing information deepfake reaction (CTI-DFR) by the DFPUD; communicating the DFR, the CTI-P, and the CTI-DFR to the sync server; converting the DFR into deepfake secondary content (DFSC); communicating the DFSC from the server to the DFUD; and instructing, by the server, the DFUD to delay presentation of the second instance of the DFC segment with the DFSC based on a delay determined from a time difference between the CTI P and the CTI DFR. Other embodiments of this aspect include corresponding computer systems, apparatus, and computer programs recorded on one or more computer storage devices, each configured to perform the actions of the methods.

Implementations may include one or more of the following features. The method where the DFAC provides a deepfake model of the DFT; and where the DFSC is generated by the server based on a deepfake subject (DFS) model for the DFPUD user; where the DFS is generated using autoencoders and a neural network; and where the DFR is adapted by the DFS to generate the DFSC; and where the DFSC facilitates replacement of a representation of the DFT with a DFS modeled representation of the DFR in the second instance of the DFC segment as presented by the DFUD. The DFSC may be generated by the DFPUD based on a deepfake subject (DFS) associated with the DFPUD user. Implementations of the described techniques may include hardware, a method or process, or computer software on a computer-accessible medium.

One general aspect includes a non-transitory computer readable medium. The non-transitory computer readable medium may include instructions for determining a delay period occurring between when a deepfake presenter user device (DFPUD) receives a first instance of a deepfake content (DFC) segment and when the DFPUD receives a deepfake reaction (DFR) from a content capture device; where the DFR is responsive to the DFC segment. The medium may include instructions for communicating a deepfake secondary content segment (DFSC) to a deepfake user device (DFUD); and where the DFSC includes a conversion of the DFR based on a model of a deepfake subject and deepfake synchronization information (DFSI) that instructs the DFUD to synchronize presentation of a second instance of the DFC segment with the DFSC based upon a determined delay. Other embodiments of this aspect include corresponding computer systems, apparatus, and computer programs recorded on one or more computer storage devices, each configured to perform the actions of the methods.

Implementations may include one or more of the following features. The non-transitory computer readable medium where the instructions are for operations that further may include: receiving deepfake augmented content (DFAC) which identifies a deepfake target (DFT) in the DFC segment; and generating the DFSC based upon the DFR, a deepfake subject (DFS) model, and the DFT; and where the DFSC instructs the DFUD to further synchronize the presentation of the second instance of the DFC segment with the DFSC based upon the DFS model and the DFT. Implementations of the described techniques may include hardware, a method or process, or computer software on a computer-accessible medium.

BRIEF DESCRIPTION OF THE DRAWINGS

The features, aspects, advantages, functions, modules, and components of the devices, systems and processes provided by the various implementations of implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Figure 1:
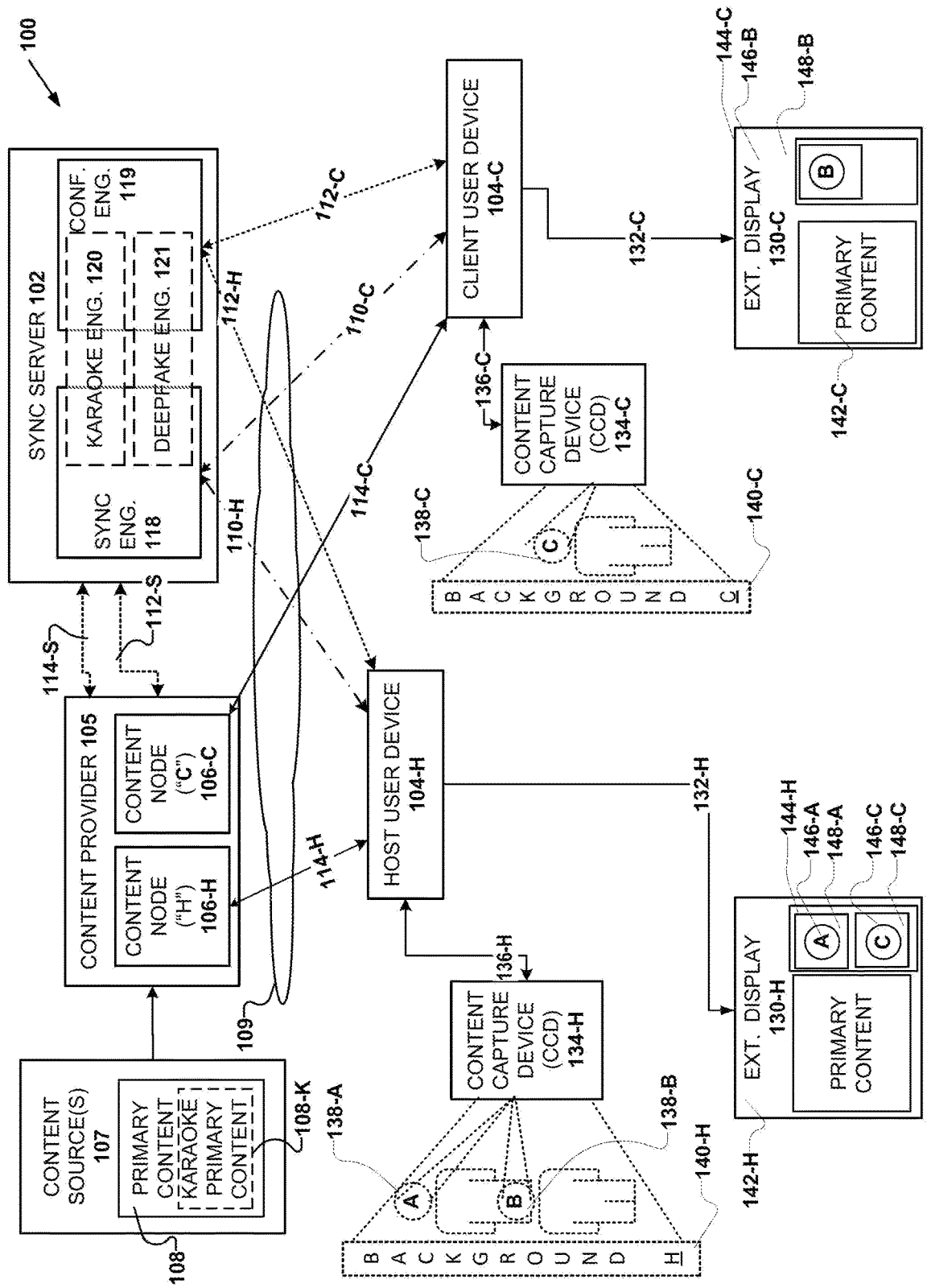
FIG. 1 is a schematic illustration of a system for facilitating Karaoke Watch Parties and Deepfake Watch Parties in accordance with at least one implementation of the present disclosure.

Various implementations of the present disclosure describe devices, systems, and processes for facilitating a watch party Karaoke and a deep fake watch party.

A "watch party" ("WP") is a "substantially simultaneous" presentation of "primary content" and "secondary content" to two or more "separate" users, where the secondary content includes audio content, video content or other content captured by a user's "content capture device" (as described below) and such content is selectively processed in view of one or more preferences for a given watch party and/or in view of one or more user preferences. A watch party may include one or more of the features and functions taught in one or more of the '277 App., the '686 App., the '815 App., the '416 App., and the '459 App.

A "Karaoke Content Watch Party" ("KWP") refers to a WP in which a user is presented with two or more of "Karaoke content," "Karaoke augmented content," and "Karaoke Secondary Content" (as described below).

A "Deepfake Watch Party" ("DFWP") refers to a WP during which a "deepfake" data processing operation is used to replace a "content element" associated with a first person, first object, or the like (herein, a "Deepfake target" ("DFT")) with one or more "secondary content" "content elements" associated with a second person, a second object, or the like (herein, such secondary content element being a "Deepfake subject" ("DFS")).

A "Party" includes one or more of a WP, a KWP and a DFWP.

A "Deepfake" data processing operation includes computer implemented operations which replace an image, sound, likeness, mannerisms, or the like (a "characteristic") associated with a DFT with characteristics of one or more DFSs. The characteristics of a given DFT and a DFS may occur in any humanly perceptible form, in any content element, such as, in one or images, frames, graphics, and audio tracks, or otherwise. For a non-limiting example, a visibly humanly perceptible characteristic of a DFT (such as a first person's face) may be replaced by a visibly humanly perceptible characteristic of a DFS (such as second person's face). For another non-limiting example, an audibly humanly perceptible characteristic of a DFT (such as the first person's voice) may be replaced by an audibly humanly perceptible characteristic of a DFS (such as the second person's voice). Deepfake data processing operations are well known in the art; non-limiting examples include: DeepFaceLab™, which is downloadable, for example via the Internet at https://deepfacelab.en.softonic.com/; Reface™, which is downloadable, for example, via the Internet at https://hey.reface.ai/; and Faceswap™, which is downloadable, for example, via the Internet at https://faceswap.dev/.

A "computer engine" (or "engine") refers to a combination of a "processor" (as described below) and "computer instruction(s)" (as defined below). A computer engine executes computer instructions to perform one or more logical operations (herein, a "logic") which facilitate various actual (non-logical) and tangible features and function provided by a system, a device, and/or combinations thereof.

"Data" (which is also referred to herein as a "computer data") refers to any representation of facts, information or concepts in a form suitable for processing by one or more electronic device processors and which, while and/or upon being processed, cause or result in an electronic device or other device to perform at least one function, task, operation, provide a result, or otherwise. Computer data may exist in a transient and/or non-transient form, as determined by any given use of such computer data.

An "Instruction" (which is also referred to herein as a "computer instruction") refers to a non-transient processor executable instruction, associated data structure, sequence of operations, program modules, or the like. An instruction is defined by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise.

"Processor" refers to one or more known or later developed hardware processors and/or processor systems configured to execute one or more computer instructions, with respect to one or more instances of computer data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, and otherwise.

"Content" refers to any information that may be presented, using a suitable presentation device, to a user in a humanly perceptible format. Non-limiting examples of content include videos, television programs, audio programs, speeches, concerts, gaming images and graphics, or otherwise. Content may include, for example and not by limitation, one or more of sounds, images, video, graphics, gestures, or otherwise. The content may originate from any source, including live and/or recorded, augmented reality, virtual reality, computer generated, or otherwise. The content may be presented to a given user using any "user device" (as described below). Content may be made available by a producer, publisher, distributor, a user, or other source of such content. For example, a producer for a new television series may initiate a WP available to select combinations of user devices. A WP, KWP, and/or DFWP may be used for promotional purposes. WPs, KWPs, and DFWPs may be used for any other lawful purpose; non-limiting examples including gambling, sporting contests, shopping, educational and training, cooking, or otherwise. Content includes one or more "segments" and one or more "elements."

A "segment" (also referred to as a "content segment") is a delineable portion of content. For a non-limiting example, a content may include audio and video for an entire football game. A content segment may include the audio and video for a given scoring play for the football game.

An "element" (which is also referred to herein as a "content element") is a humanly perceptible and uniquely identifiable portion of one or more content segments. For a non-limiting example, an audio content element for a segment of a motion picture may include humanly perceptible audio tracks, such as audio tracks for one or more actors, instruments, sound effects, or otherwise provided in a primary content. Non-limiting examples of motion picture audio tracks may include: actor dialogue tracks; a scene track providing, e.g., sounds such as traffic noise, birds chirping, actors screaming, or otherwise; an audience track, e.g., a laugh track or an applause track; a musical instrument track, e.g., a drum track, a lead guitar track, a rhythm guitar track, a piano/organ/synthesizer track, a sound effects track, one or more orchestral instrument tracks, one or more choir tracks; and other audible tracks.

For at least one implementation, WP, KWPs and/or DFWPs may be used for sporting contests, such as MARCH MADNESS, the OLYMPICS, the WORLD CUP, FORMULA 1 races, or otherwise to facilitate common viewing of real-time content of particular interest to one or more users. For example, last minute action in a basketball game may be presented to multiple users during a watch party. Content may be stored, transmitted, processed or otherwise manipulated in non-humanly perceptible formats that may be converted, by known and later arising devices, systems and methods, into humanly perceptible information presented by a suitable presentation device. Current implementations of such presentation devices are well known any suitable known or later arising presentation device may be used for content presentation to users.

"Primary Content" is content provided by a "content source" (as described below) for presentation to multiple users using one or more "user devices" (as described below). Primary content may have any form, format, length, duration, or the like and includes "segments" and "elements" thereof (as described below).

"Karaoke content" (KC) is "primary content" provided for presentation during a KWP.

"Karaoke Augmented Content" (KAC) refers to content, provided by a "content source" and in relation to a given KC, which facilitates user participation in a KWP. Non-limiting examples of such KAC include lyrics to a song (as presented, e.g., in a textual representation or in a musical score representation), music/sound timing representations, virtual instrument fingerings (such as those a user might be presented during a ROCKBAND™ or similar video gaming content), or otherwise.

For at least one implementation, a KAC includes "content timing information" (as described herein) which facilitates synchronization of a "Karaoke reaction" with a given "Karaoke content" segment (or element thereof). Such "content timing information" is referred to herein as "Karaoke synchronization information ("KSI")." For at least one implementation, KSIs identify a timing relationship between two or more segments and/or elements of "Karaoke content," KACs, "Karaoke reactions," and/or "Karaoke secondary content."

"Deepfake content" (DFC) is "primary content" provided for presentation during a DFWP.

"Deepfake Augmented Content" (DFAC) refers to content, provided by a "content source" in relation to a given DFC which facilitates user participation in a DFWP. Non-limiting examples of a DFAC include content that identifies a "Deepfake target" (DFT) in a given DFC by time, by a Deepfake model, by an identifier such as a persons, event title, location or the like, or otherwise.

For at least one implementation, a DFAC includes "content timing information" (as described herein) which facilitates synchronization of a "Deepfake reaction" (DFR) with a given DFC segment (or element thereof). Such "content timing information" is referred to herein as "Deepfake synchronization information ("DFSI")." For at least one implementation, DFSIs identify a timing relationship between two or more segments and/or elements of DFCs, DFACs, "Deepfake reactions," and/or "Deepfake secondary content."

"Secondary Content" is content provided by another entity, such as a user, an artificial intelligence, or otherwise in reaction, response, based upon, or otherwise in view of (herein, "responsive") a given primary content and/or another secondary content. Secondary content may include one or more user "reactions" to primary content and/or to other reactions. Secondary content may include "Karaoke Secondary Content" and/or "Deepfake Content." Secondary content may include other information, generated by any entity, such as statistics, background information regarding primary content, information regarding a reaction, or otherwise. Secondary content may be captured and presented in any format, non-limiting examples including audio/video formats, text based formats, and otherwise. Secondary content may be humanly perceptible or imperceptible. For an implementation, secondary content may include reactions captured as "chat data" (as described below).

"Karaoke Secondary Content" (KSC) is a form secondary content generated by a sync server and/or a user device from a "Karaoke Reaction" (as described below) and provided to a second user device during a KWP. For at least one implementation, a KSC include a Karaoke reaction and a KSIs. The KSC facilitates the incorporation, integration, and substantially simultaneous presentation of a Karaoke reaction with a given KC segment to present a KWP on the second user device.

For at least one implementation, KSCs may be incorporated into a presentation of a content segment by the second user device to facilitate a virtual, integrated presentation of the content segment and the Karaoke reaction as would commonly occur during a Karaoke session held in a restaurant, bar, home or other physical location.

Non-limiting examples of KSCs include vocals (such vocals being captured as one or more Karaoke reactions) plus synchronization information, which synchronizes the vocals to a given content segment or element, which collectively are provided to a second user device during a KWP. KSCs are generated from Karaoke reactions and for at least one implementation may include a given Karaoke reaction in a native, as captured form, and/or in a processed form, such as a form to which one more currently available and/or later arising audio and/or video processing techniques may be applied, non-limiting examples include DOLBY™ Surround Sound processing, THX™ processing, and the like.

For at least one implementation, KSC may be hierarchically identified as a subsidiary form of secondary content for a Party. For at least one implementation, a KSC may be provided as transient computer readable data intended for transient and substantially simultaneous use (with the capturing and communicating of a given Karaoke reaction) during a KWP. For another implementation, a KSC may be captured and stored in a non-transient computer readable data format for contemporary and/or later use. A given use of a KSC is context sensitive and refers to: its transient form, when transmitted across a network and/or presented, e.g., to a user via a user presentation device substantially simultaneous with a capturing of a Karaoke reaction; and, its non-transient form, when a KSC is stored in a computer readable data format for any given length of time.

"Deepfake Secondary Content" ("DFSC") is secondary content provided by a server to two or more user devices during a DFWP. For at least one implementation, DFSC is a form of secondary content. DFSCs include "Deepfake reactions" captured by a "content capture device" plus Deepfake synchronization information which facilitates the incorporation, integration, and substantially simultaneous presentation of a Deepfake reaction with a given content segment to present a DFWP on the second user device. DFSCs may be incorporated into a presentation of a content segment by the second user device to facilitate a virtual, integrated and synchronized presentation of the content segment and the Deepfake reaction during a DFWP.

For at least one implementation "Deepfake Reactions" may be processed into DFSCs for use during a DFWP. DFSCs may be provided as transient computer data intended for transient user during a DFWP and/or may be stored as non-transient computer data for contemporary and/or later use. DFSCs may be context sensitive and may refer to their transient form, when transmitted across a network and/or presented, e.g., to a user via a user presentation device, and to its non-transient form, when stored on a computer readable medium for any given length of time. For at least one implementation, DFSCs may be generated by a user device, a server, or otherwise based on one or more "Deepfake Reactions."

"Watch Party Content" ("WPC") refers to primary content and secondary content presented during a Party.

A "reaction" is a response, by a user, to primary content and/or secondary content. The reaction may be to one or more primary content segments and/or secondary content segments. A reaction may be imperceptible to others, for example, an elevated heart rate of a given user. A reaction may be perceptible to others, for example, an outburst of sounds, motion (e.g., hand waving), or otherwise by a given user. A reaction may be ephemeral, ongoing, or otherwise. A reaction that does not include a "Karaoke reaction" and/or a "Deepfake reaction," is further identified herein as a "standard reaction."

A "Karaoke reaction" ("KR") is a reaction captured by a "content capture device" that may be stored in a native format and/or processed into and stored as a KSC. A KR and/or corresponding KSC may be provided for use during a KWP. A KR may be non-transiently captured by a "content capture device" and identified, communicated, processed, stored and/or otherwise manipulated by a data processor or similar device, as a form of computer readable data. A KR, may be captured, stored, processed into a KSC corresponding thereto, and the KSC presented to other KWP users on a "live," "delayed" or "recorded" basis (as defined below). When presented to other participants on a non-live basis, a KR and a KSC are referred to herein as a "Delayed Karaoke reaction" (a subset of a later reaction) and a "Delayed Karaoke Secondary Content," a subset of secondary content. A KR may be second captured and converted into a KSC by a user device or sent to a sync server for processing into a KSC, storage, communication to other user devices, and otherwise. Based on media event data or other data, a KR and KSC may be synchronized by a server, user device, combination thereof, or otherwise with one or more reactions and/or other KRs and with a given content segment (or one or more elements thereof) so as to be later presentable to a participant in synchronization with a presentation of a recorded primary content (or segment thereof) and one or more recorded prior reactions.

A "Deepfake reaction" ("DFR") is a form of a reaction that is captured for use in a DFWP. A DFR may be captured by a "content capture device," computer generated, or otherwise. A DFR may be stored in a native form and processed into a DFSC. The DFR and/or DFSC may be provided by a user device to a server for use during a DFWP. A DFR and corresponding DFSC may be presented to DFWP users on a "live," "delayed" or "recorded" basis (as defined below). When presented on a non-live basis, a DFR is referred to herein as a "Delayed Deepfake reaction," which is a subset of a later reaction. Based on media event data or other data, a DFR and/or a DFSC may be synchronized by servers, user devices, combinations thereof, or otherwise with one or more primary content, secondary content, DFSCs, and otherwise so as to be later presentable to a participant in synchronization with a presentation of a recorded given content (or segment or element thereof), such as a primary content, and one or more recorded DFRs.

A "content capture device" ("CCD") is a device configured to capture one or more reactions including, but not limited to, KRs and DFRs. Non-limiting examples of CCDs include video cameras and microphones provided separately, individually, collectively or otherwise on, with and/or configured for use electronic devices smart glasses, smartphones, tablets and the like, body cameras such as GOPROS and the like, drone cameras, video cameras, and the like. A reaction may occur by a user in response to a primary content and/or a secondary content and is captured by a CCD. One or more KRs and/or DFRs may be captured by a CCD with respect to any given primary content and/or secondary content.

"Media event" refers to a combination of "primary content" and "synchronization information" (as described below) for such primary content.

"Live" refers to a transmission and presentation of a primary content to two or more users that occurs at or within one minute of a first availability of such primary content for presentation to such two or more users.

"Recorded" refers to primary content first available to two or more users and where such primary content is delayed and/or later presented to two or more users more than one minute after the first availability of such content, such as, on an on-demand, time delayed, or other basis.

"Delay" refers to a period of time after a first event before a second event occurs. For a non-limiting example, a delay may occur between a presentation of a primary content segment and a reaction during a WP. A delay may occur for a pre-determined, dynamically determined, or otherwise determined length of time. A delay may be quantified using any metric, such as transmission time, presentation time, received versus sent time, latency, or otherwise. For at least one implementation, a given delay may be less than one second (1 sec) after a given live presentation of a content segment during a KWP. For at least one implementation, a given delay may be less than ten seconds (10 sec) after a live presentation of a content segment during a DFWP. For another implementation, a given delay may be determined based on a quantification of one or more networked communications characteristics occurring during a given KWP and/or DFWP. It is to be appreciated that such one or more networked communications characteristics may vary over time and with use thereof.

For a non-limiting example, a given delay may be determined, dynamically or otherwise, based on an average network latency for one or more user devices attending a given media event, a worst-case latency for a given user device attending the KWP or DFWP, based upon bandwidth constraints, data processing constraints of one or more user devices, or otherwise. A delay may include a waiting period that ends upon a conclusion of a given live presentation of content during a KWP or DFWP. A delay may end after a live sporting event concludes. A delay may include a waiting period that ends upon a conclusion of a given presentation of a live or recorded content segment.

"Real-time" refers to a presentation of a primary content segment and secondary content where such presentation occurs substantially simultaneously based upon when such primary content segment is first available for presentation to a user, via a user device, such as at the time of the primary content segments first generation. A real-time presentation may include a primary content segment being presented on a live or on a recorded basis to one or more users via a compatible presentation device (such as a television or video display), after a given delay period (for example, a two-second delay period), or otherwise. For a non-limiting example, a KWP and/or DFWP of a football match captured and presented as one or more primary content segments and one or more WP, KWP and/or DFWP content segments occurs real-time when one or more users may view the primary content and the WP, KWP and/or DFWP content segments, using a sound system, television or other content presentation device, at substantially the same time (while accounting for data processing and transmission delays and other delay periods) as a spectator, in a viewing stands, could view the match.

"Separately," when referring to two or more users participating in a KWP or DFWP, means a first user may be physically or virtually separated from one or more second users such that a user is uniquely and independently provided a given content, such as a primary content provided by a content provider. Such separation may include a geographic separation, wherein a first user is in a different room, building, city, state, or country than one or more second users. A separation may occur virtually, such as when a first user receives the content and/or reaction(s) as presented, in whole or in part, in a first format (such as an audible portion of the football game in a first language), while a second user receives content and/or reactions in a second format (such as the audible portion of the football game being provided in a second language). For at least one implementation, separation may occur one or more of geographically and virtually.

"Collaboratively" means that a given users' reaction to the live and/or recorded content may be captured and shared with other users participating in the KWP and/or DFWP within an expected delay period, if any, with the user's actual reaction.

"Substantially simultaneous(ly)" means without incurring a greater than expected and humanly perceptible delay between a first event or condition, such as a presentation of a primary content, and a second event or condition, such as a presentation of secondary content, to two or more users using their respective user devices. Substantial simultaneity may vary in a range of quickest to slowest expected delay, for example, during a WP, to a moderate delay, for example, during a KWP, to longer delay, for example during a DFWP. That is a humanly perceptible delay for a DFWP may be larger and satisfy a "substantially simultaneous" subjective and acceptable threshold than might be deemed to be unacceptable for a WP. It is to be appreciated that the subject and acceptable threshold of "substantial simultaneity" is also distance, data processing, and data communication capabilities dependent. For example, a WP, KWP or DFWP conducted using gigabit Ethernet capable local area network (LAN) connections may have a shorter acceptable delay period (and a more stringent substantially simultaneous requirement) than may apply to a WP, KWP or DFWP conducted over a 3G network, where data communications are knowingly slower and thus a given (longer) delay period may satisfy a subject substantially simultaneous threshold.

A WP, KWP and/or DFWP may include the presentation of audio and video, for a given primary content and/or secondary content, to users with "low latency" and at "high quality." As used herein, "low latency" means a transmission of content from a source to a user device with less than a one second delay between the time of transmission of the content by the source and reception of such content by the user device. As used herein, "high quality" when referring to audio-video (A/V) content (for example and not by limitation) means that the content is transmitted by a content source directly, for example using a direct satellite connection, or indirectly, for example, using a network, to a user device at three or more megabytes per second (3 MBPS), at a video resolution equal to or greater than the '720p "high definition television" ("HDTV") standard. For at least one implementation, high quality may include the use of adaptive bit rate ("ABR") transmission technologies. Such ABR technologies may be configured to provide content at a "low latency" while using a varying video resolution over time. "Medium quality" means AV content that is transmitted by a content source to a user device at a "standard definition television" (SDTV) standard.

"(In)directly" means that a transmission of a given content from a source to a given user device may be direct, such as occurs with radio and satellite broadcast television signals, or indirect, such as occurs with streaming and over-the-top (OTT) transmissions. Indirect transmissions may include use of various network technologies, including "Cloud" technologies.

"Cloud" refers to cloud computing, cloud storage, cloud communications, and/or other technology resources which a given user does not actively manage or provide. A usage of a Cloud resource may be private (limited to certain users and/or uses), public (available for many users and/or uses), hybrid, dedicated, non-dedicated, or otherwise. It is to be appreciated that implementations of the present disclosure may use Cloud resources to provide for processing, storage and other functions related to facilitating live cell phone watch parties.

"Module" recites definite structure for an electrical/electronic device that is configured to provide at least one feature and/or output signal and/or perform at least one function including the features, output signals and functions described herein. Such a module may provide the one or more functions using computer engines, processors, computer instructions and the like. When a feature, output signal and/or function is provided, in whole or in part, using a processor, one more software components may be used and a given module may be include a processor configured to execute computer instructions. A person of ordinary skill in the art (a "POSITA") will appreciate that the specific hardware and/or computer instructions used for a given implementation will depend upon the functions to be accomplished by a given module. Likewise, a PHOSITA will appreciate that such computer instructions may be provided in firmware, as embedded software, provided in a remote and/or local data store, accessed from other sources on an as needed basis, or otherwise. Any known or later arising technologies may be used to provide a given module and the features and functions supported therein.

WP, KWP and DFWP Systems 100

As shown in FIG. 1, a system 100 for facilitating a WP, a KWP and/or a DFWP may include a sync server 102. The sync server 102 may be communicatively coupled by a communications network 109, such as one that utilizes in whole or in part the Internet, a Cloud, or otherwise, to two or more user devices ("UD") 104, such as one or more host UDs 104-H and one or more CUDs 104-C, using sync links 110-H/C and conference links 112-H/C.

The sync server 102 and two or more UDs 104 may be communicatively coupled to at least one content node 106. A content node 106 may be associated with a content provider 105 that receives primary content 108 from a content source 107. For a KWP, the primary content 108 may include Karaoke augmented content (KAC) 108-K.

Such communicative coupling of a UD 104 with a content node 106, such as content nodes 106-H and 106-C may include use of content links 114, such as a host content link 114-H, a client content link 114-C, and a server content link 114-S. A UD 104 and/or the sync server 102 may be separately coupled to a content node 106 by a content link 114. More than one UD 104 may be coupled to a given content node 106.

A UD 104 may be coupled to one or more CCDs 134, such as a host CCD 134-H and a client CCD 134-C. CCDs 134 may be configured to capture reactions, such as user data 138. CCDs 134 may capture background content and provide the same as a background data 140. As used herein, "user data 138" and "background data 140" may include any form of content captured by a given one or more CCD(s), with non-limiting examples including audio content and/or video content. A CCD 134 may be configured to capture audio data, such as lyrics sung by the first user "A" or the like. A CCD 140 may be configured to capture any form or forms of user data 138 and/or background data 140 during a WP, KWP and/or DFWP.

A UD 104 may be coupled to a given CCD 134 using a CCD link 136, such as a host CCD link 136-H or a client CCD link 136-C. For a non-limiting example, an image of user's head or face, such as those for a first user "A" a second user "B" or a third user "C" may be provided as respective first user data 138-A, second user data 138-B and third user data 138-C. Further, one or more background data 140, such as a host background data 140-H or a client background data 140-C, may be captured by one or more CCDs 134 and provided to a UD 104 for further data processing, storage, and the like.

Sync Server 102

Figure 2:
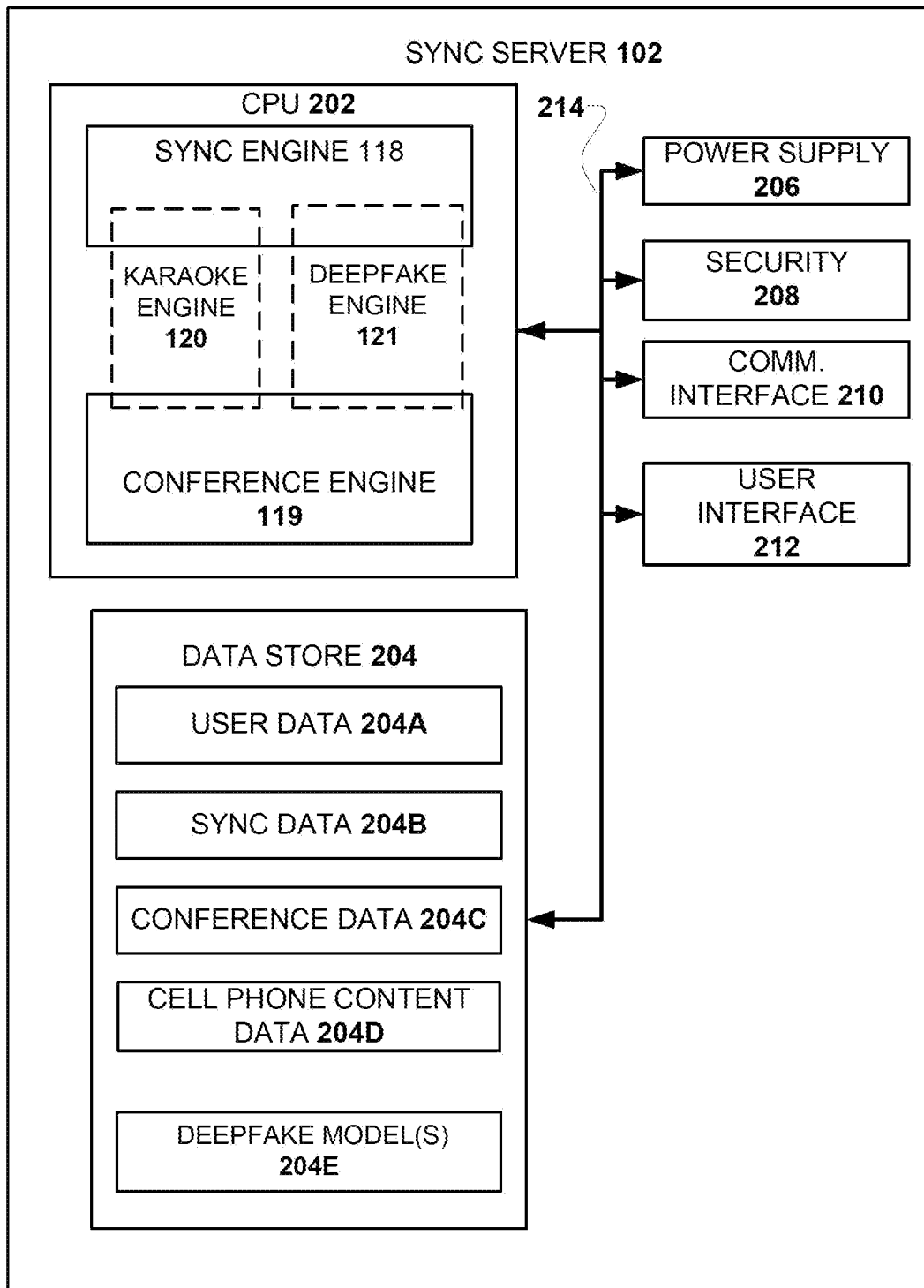
FIG. 2 is a schematic illustration of synch server for facilitating Karaoke Watch Parties and Deepfake Watch Parties and in accordance with at least one implementation of the present disclosure.

As shown in FIGS. 1 and 2, the sync server 102 may include a server CPU 202 executing two or more computer engines including a server sync engine 118, a server conference engine 119, a server Karaoke engine 120, a server Deepfake engine 121, a server data store 204, a server power supply 206, a server security 208, a server communications interface 210 and a server user interface 212. One or more of the logics facilitated by the computer engines may be combined, included, not included, distributed across one or more sync servers 102 and/or provided by one or more engines. It is to be appreciated that engines may be provided separately, collectively, or otherwise by one or more correspondingly configured physical devices, systems, and/or collection of devices and systems.

Server CPU 202

A sync server 102 may include a processor (herein, identified as a server central processing unit (CPU) or "server CPU" 202). Any known or later arising processor may be used. The server CPU 202 may be provided by a processing device capable facilitating one or more logics by executing one more computer instructions with respect to computer data. One or more of the server engines such as the server sync engine 118 and the server conference engine 119 may be executed by one or more threads on the server CPU 202, or otherwise. The server CPU 202 may include one or more physical components configured for such data processing operations. Any known or later arising technologies may be utilized in conjunction with an implementation of the present disclosure to facilitate the server CPU 202, the server sync engine 118, the server conference engine 119, the server Karaoke engine 120, and/or the server Deepfake engine 121. It is to be appreciated that the server Karaoke engine 120 may not be provided to the sync server 102 in a given set of computer instructions or instantiated by the server CPU 202 for an implementation of a WP and/or a DFWP and a server Deepfake engine 121 may not be provided to the sync server 102 in a given set of computer instructions or instantiated by the server CPU 202 for an implementation of a Party.

A sync server 102 may instantiate one or more computer engines as one or more threads operating on a computing system having a multiple threaded operating system, such as the WINDOWS 10 operating system, LINUX, APPLE OS, ANDROID, and others, as an application program on a given device, as a web service, or otherwise. An Application Program Interface (API) may be used to support an implementation of the present disclosure. A sync server 102 may be provided in the virtual domain and/or in the physical domain. A sync server 102 may be associated with a human user, a machine process executing on one or more computing devices, an API, a web service, instantiated on the Cloud, distributed across multiple computing devices, or otherwise. A sync server 102 may be any electronic device configurable to communicate data using a network, directly or indirectly, to another device, to another server, or otherwise.

The server CPU 202 may be communicatively coupled, by a server data bus 214 or similar structure, to other components of the sync server 102 including, but not limited to, a server data store 204, which may also be referred to as a "computer readable storage medium."

Server Sync Engine 118

Figure 3:
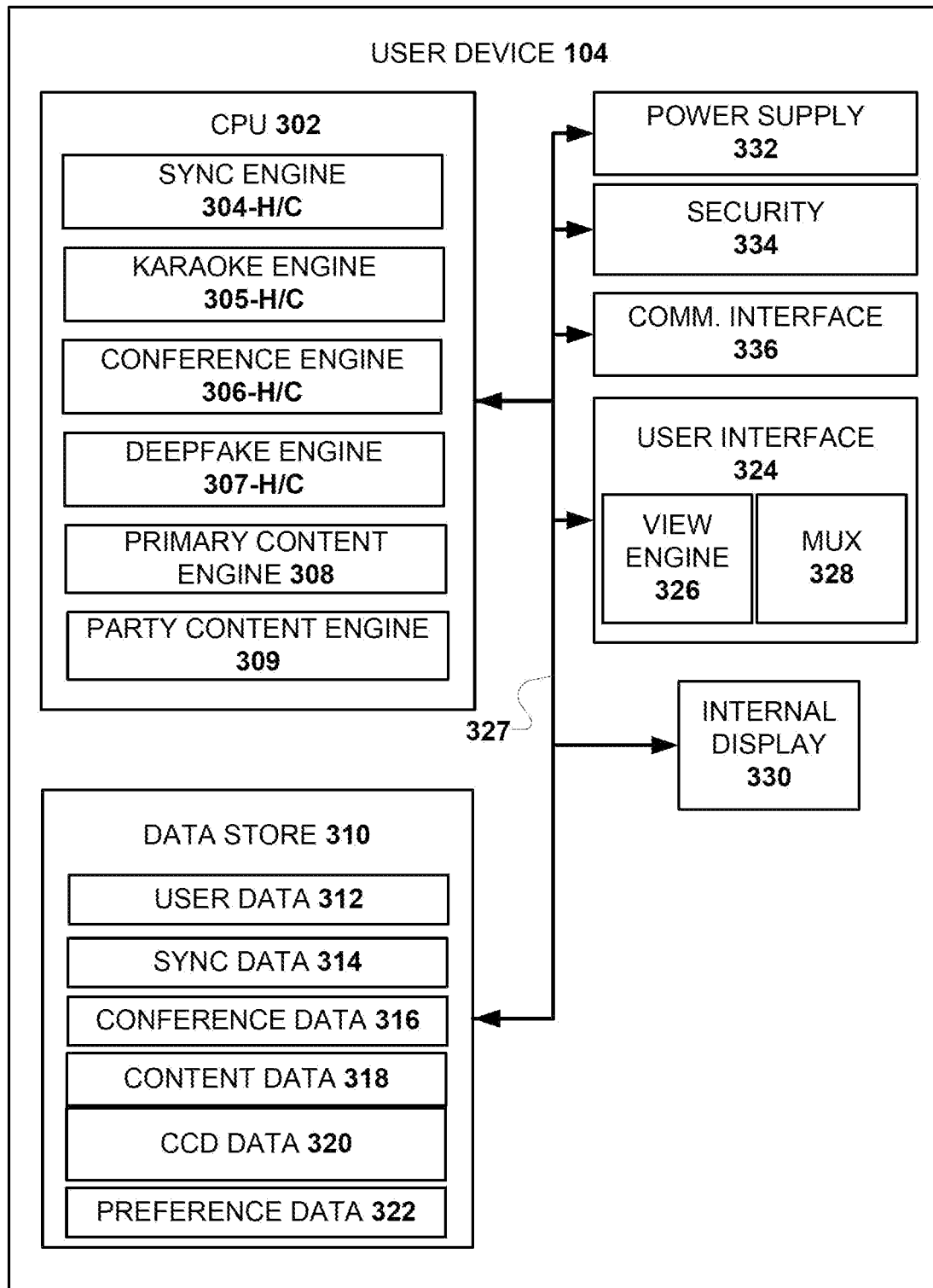
FIG. 3 is a schematic illustration of a user device for facilitating Karaoke Watch Parties and Deepfake Watch Parties and in accordance with at least one implementation of the present disclosure.
Figure 4A:
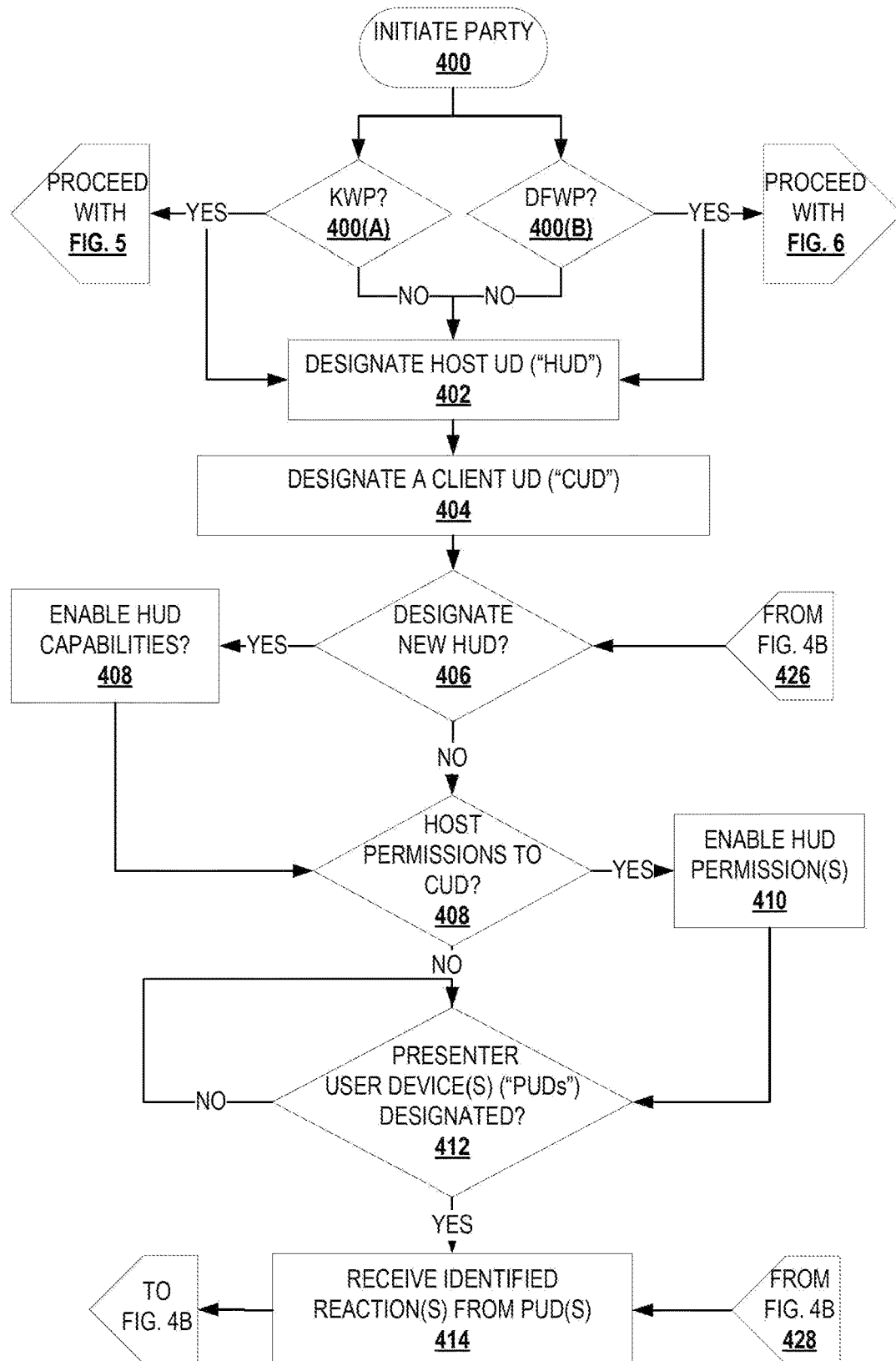
FIGS. 4A and 4B illustrate a process for implementing Party that may include a Karaoke Watch Party and/or a Deepfake Watch Party and in accordance with at least one implementation of the present disclosure.
Figure 4B:
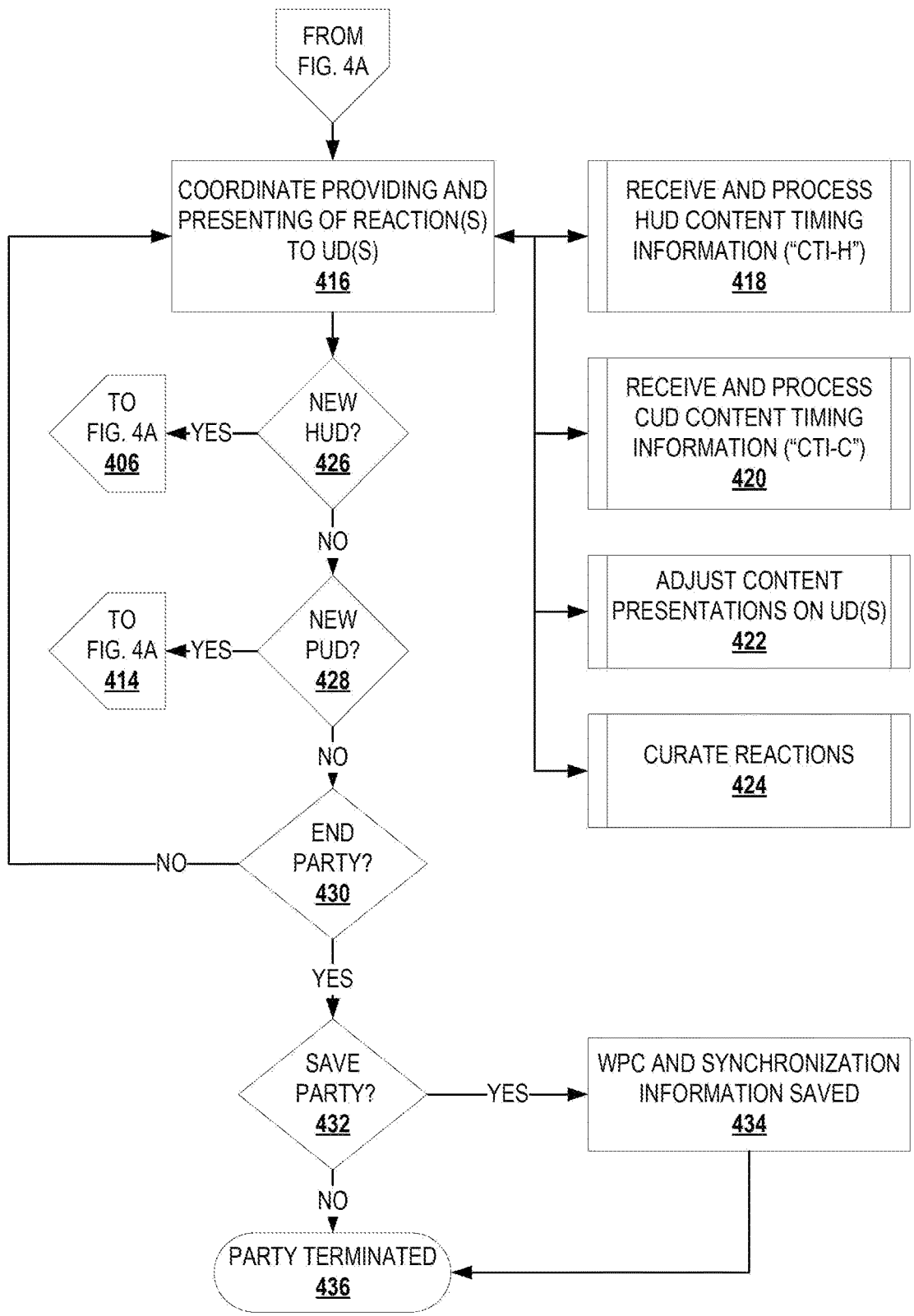

With reference to FIGS. 1, 2, 3, 4A, 4B, 5 and 6, a server sync engine 118 manages synchronization of primary content and secondary content during a Party. For at least one implementation, operations of the server sync engine are illustrated in FIG. 4A herein. Such operations are non-limiting and for at least one implementation of a WP. Other operations, sequences thereof, combinations, and/or permutations thereof may be used in accordance with other implementations of the present disclosure.

Figure 5:
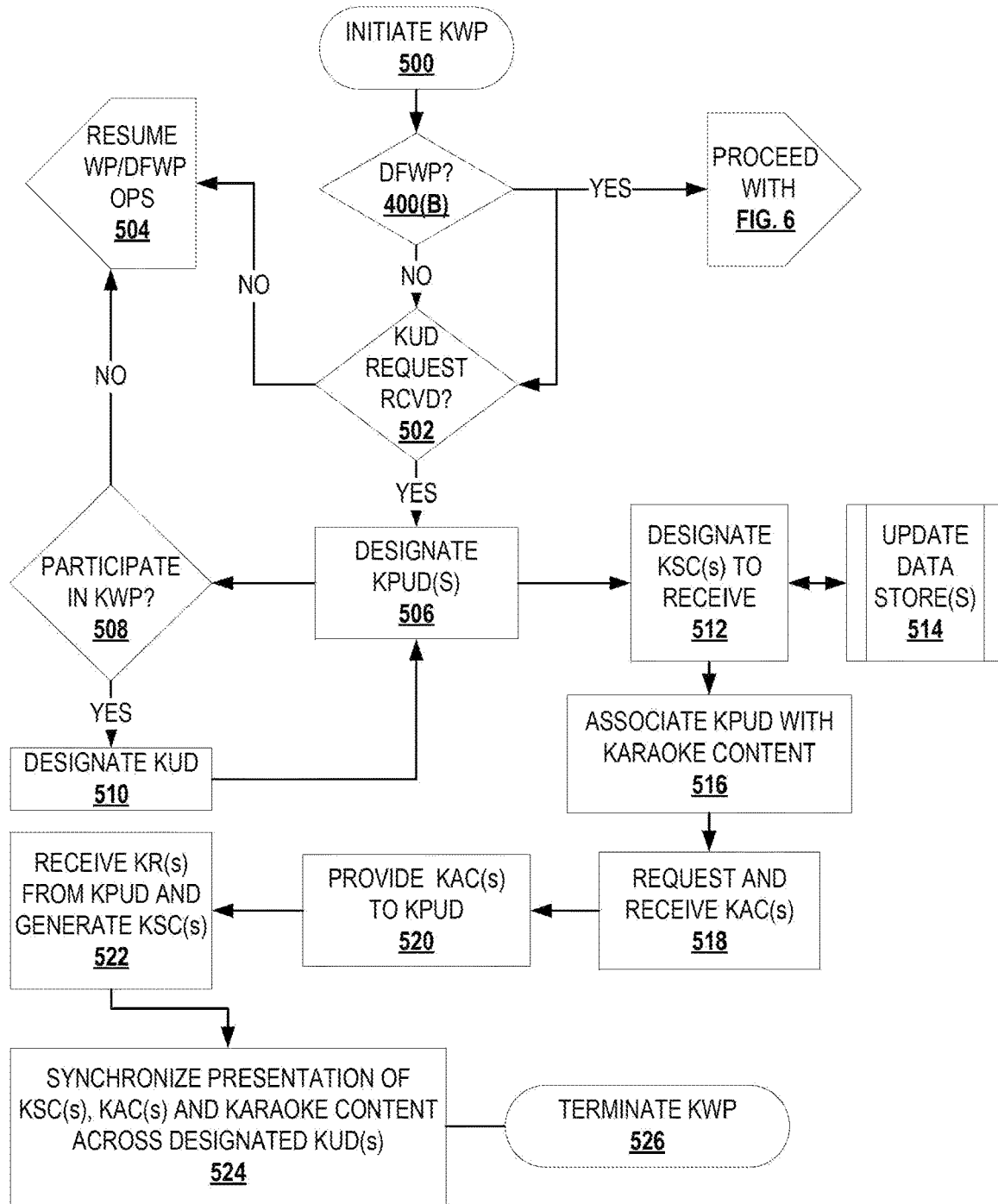
FIG. 5 illustrates a process for implementing a Karaoke Watch Party, that may include a Party and/or a Deepfake Watch Party and in accordance with at least one implementation of the present disclosure.

The server sync engine 118 also manages, in conjunction with the server Karaoke engine 120, synchronization of KSCs during a KWP. For at least one implementation, such operations are illustrated in FIG. 5, and are further described below.

Figure 6:
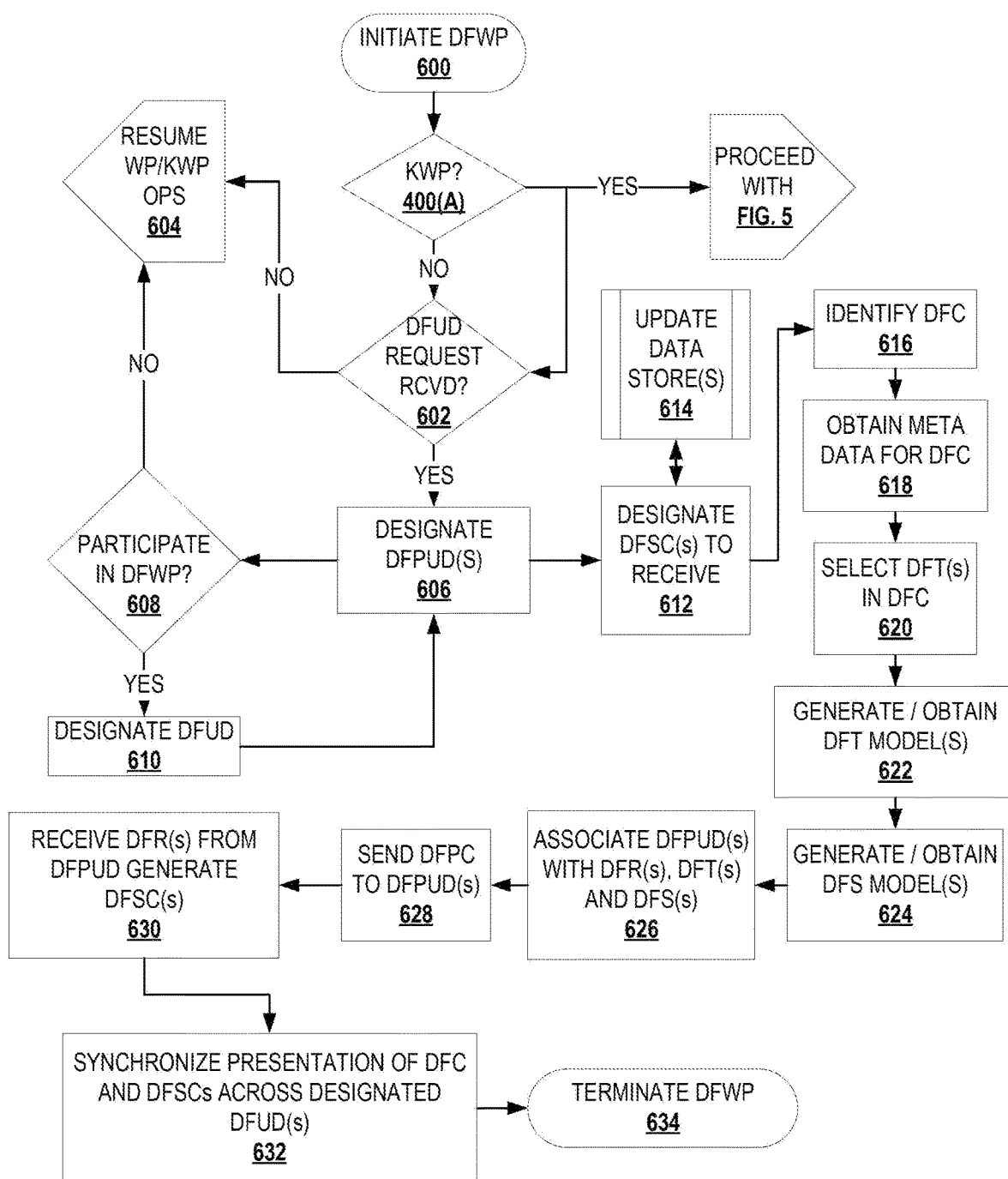
FIG. 6 illustrates a process for implementing a Deepfake Watch Party, that may include a Party and/or a Karaoke Watch Party and in accordance with at least one implementation of the present disclosure.

The server sync engine 118 also manages, in conjunction with the server DeepFake engine 121, synchronization of DFCs during a DFWP. For at least one implementation, such operations are illustrated in FIG. 6, and are further described below.

When a Party is initiated (as illustrated by Operation 400) the server sync engine 118 will request and receive status and other synchronization information regarding the communication of WPC and other content to and from a UD 104. A UD 104 during a Party executes their UD sync engines 304 (as described below), and provide the information used to synchronize the providing of content during a Party. Various operations of a server sync engine 118 and UD sync engines 304 to so synchronize content are described in the '815 application with particular reference to FIGS. 3A-3E therein, such description is incorporated herein by reference. As shown by Operation 400(A) and Operation 400(B), serial and/or parallel operations may occur which respectively utilize one or more of the server Karaoke engine 120 and server Deepfake engine 121 for KWP and/or DFWPs, as described below and with references to FIGS. 5, 6, 7 and 8.

Synchronization information is communicated by and between the sync server 102 (and the server sync engine 118) and the UD sync engines 304 using the two or more sync links 110 (as shown in FIG. 1). The providing of WPC between UDs 104, the sync server 102, and other content during a Party is facilitated by a server conference engine 119 and respective conference engines 306 (as described below). The server sync engine 118 synchronizes the providing and presenting of WPC by two or more UDs 104 during a Party. As described herein, such WPC may be provided by content sources 107, UDs 104 (as secondary content) and otherwise.

A Party may be established by the sync server 102 with respect to a given WPC. For an implementation, multiple Parties may be established with respect to a given WPC. A given UD 104 may be configured to participate in one or more of such multiple Parties, and the server sync engine 118 may be configured to monitor and identify UDs 104 participating in a given Party, at a given time. A Party may include a subset of UDs 104 otherwise participating in a collection of Parties for a given event and/or for a given WPC.

As illustrated by Operation 402 and for at least one implementation of a Party, the server sync engine 118 facilitates synchronization of WPC by designating a given UD 104 as a "host" user device 104-H (or "HUD"). A given UD 104 may be designated, by a sync server 102 (with corresponding designations being implemented by UD sync engine(s) 304) as a HUD 104-H for multiple Parties. For example, a professional sports league, such as the NFL, may be designated as an IUD, while a team may be designated as a HUD 104-H for a live and/or recorded presentation of a sporting event, with multiple Parties being established for multiple users of disparate locations, interests, languages, or otherwise.

As shown in Operation 404, one or more remaining UDs in a given Party may be designated as a "client" user device 104-C (or "CUD"). For an implementation, at least one UD 104 is designated as the HUD 104-H during the entirety of a Party and at least one UD 104 is designated as a CUD 104-C.

As illustrated by Operation 406, at any given time, the server sync engine 118 may be configured to designate another UD 104, such as CUD 104-C, as the HUD 104-H. For example, and not by limitation, as when a prior HUD 104-H is no longer participating in a given Party, the server sync engine 118 may designate CUD 104-C as the HUD 104-H.

When an existing HUD 104-H is disconnected from a Party, the server sync engine 118 may be configured to immediately, after an elapsing of a pre-determined or otherwise determined period, or based on some other period, event, or otherwise, suspend, and/or cancel, the Party until a HUD 104-H is able to rejoin or continue in a HUD capacity.

As illustrated by Operation 408, when designated as a HUD 104-H, a previously designated CUD 104-C may be configured to include the one or more capabilities of a HUD 104-H. Such capabilities may be activated, download, or otherwise made available to the newly designated HUD 104-H using a user device sync engine 304-H/C.

For an implementation, designations of UDs as HUDs and/or CUDs may be made by the server sync server 118 (in conjunction with a HUD sync engine) by a then active and/or an initiating HUD 104-H so requesting. As used herein, an initiating HUD (or "IUD") is a user device that initiated a Party by sending one or more invites to other UDs to participate in a given Party. An IUD is designated as a HUD for a given Party unless a redesignation of a UD as a HUD occurs before, during, or after a Party.

As illustrated by Operation 410, when designated, a server sync engine 118 may enable one or more host functions, features, permissions and the like (herein, "HUD permissions") on the new HUD. For at least one implementation, the server sync engine 118 (in conjunction with the newly designated UD sync engine 304) configures the new HUD to implement such one or more HUD permissions. The server sync engine 118 may implement fail-over and other designation rules (as set forth in computer data and/or computer instructions) governing if and when re-designation of a CUD 104-C as a HUD 104-H is to occur for a Party.

As illustrated by Operation 412, the server sync engine 118, separately and/or upon request by an active HUD 104-H and/or an IUD, may designate one or more CUDs 104-C as a presenter device ("PUD"). Herein, a PUD is a UD by which a user (herein, such person being a "presenter" and/or a "presenting user") provides a "reaction" (as described above) during a Party. Multiple PUDs may be designated singularly and/or in a plurality and at any time during a Party.

A given UD 104 may be designated, by an active server sync engine 118, as a HUD, a CUD, a hosting presenter (i.e., a user device then possessing, at a given time, the host and presenter designations), and/or a client presenter (i.e., a user device possessing, at a given time, the client and presenter designations). An IUD and/or a then active HUD 104-H may designate a given CUD 104-C as a PUD at any given time. Such designations may be revoked, transferred, or otherwise designated, at any time, by the server sync engine 118 in a then active HUD 104-H and/or by the IUD. PUD designations are implemented on one or more UDs participating in a Party.

As illustrated by Operation 414, reactions are captured by a PUD and identified (using a UD sync engine 304) to the server sync engine 118 for synchronization of presentation thereof on two or more UDs participating in the Party.

As illustrated by Operation 416, the server sync engine coordinates the providing and presentation of the reactions on the other UDs participating in the Party. As described below, the reactions themselves are communicated, by the respective PUD conference engine 306, to the server conference engine 119, which then further distributes the reactions to one or more, if any, other UDs participating in the Party. The designating of PUDs and processing of reactions for a WP are described in one or more of the '277 App., the '686 App., the '815 App., the '459 App., and the '416 App.; such descriptions are again, incorporated herein by reference.

As illustrated by Operation 418, the server sync engine 118 (alone or in conjunction with UD sync engines 304) synchronizes presentations of WPC, including primary content and reactions, based upon "content timing information" associated with the HUD.

As used herein, "content timing information" (CTI) includes timing information provided by a designated user device to a sync server. For an implementation, various types of CTIs may be communicated by a UD sync engine 304 to the server sync engine 118. For another implementation, various CTIs may be estimated and/or otherwise determined by the server sync engine 118 based upon link characteristics and/or other information available to the server sync engine 118 at a given time. A CTI may be based on a uniquely identifiable portion of a content segment, or element thereof. A non-limiting example of a uniquely identifiable portion of a primary content segment that includes a frame of A/V content capable of being independently rendered by a UD 104, is an "I" frame in a motion pictures expert group ("MPEG") group of pictures ("GOP"). Other approaches may be used to identify a primary content segment or element thereof. For at least one implementation, MPEG compression algorithms and the like may be used for identifying WPC segments and elements, regardless of source and include secondary content captured by a CCD 134 or otherwise.

A non-limiting example of a CTI is a host CTI (a "CTI-H"), which indicates delays incurred between sending and/or actual times of receipt and/or presentation to a user of a given primary content segment (and/or a secondary content segment) by a HUD 104-H. For an implementation, the CTI-H may be determined based on a "sent time" at which a given primary content segment is sent to the HUD 104-H, plus any delay period incurred between the sent time and a later time at which the given primary content segment is ready for presentation by the HUD 104-H to a user thereof. For an implementation, the sent time may be provided by synchronization information associated with the given primary content segment. The CTI-H may account for one or more of delays including transmission delays, data processing delays, other synchronization delays, such as those specified by server, user initiated delays, such as a pause operation, or otherwise. For at least one implementation, CTI includes synchronization information plus any "delay period."

As used herein, "synchronization information" includes information which identifies a given point in time relative to a beginning and/or end of a given primary content or secondary content, a respective segment thereof, and/or a respective element of a respective segment. Non-limiting examples of "synchronization information" include audio/video ("A/V") frame synchronization data, universal time code ("UTC") data, content based data, metadata associated with a given content, or otherwise.

As illustrated by Operation 420, the server sync engine 118 (alone or in conjunction with UD sync engines 304) synchronizes WPC presentations based upon CTIs associated with two or more CUDs (herein, a "CTI-C"). A CTI-C is similar to a CTI-H and identifies delay periods incurred between a sending and/or actual times of receipt and/or presentation to a CUD user of a given primary content segment (and/or a secondary content segment) by the given CUD 104-C. Unless adjusted by the server sync engine 118 (alone or in conjunction with UD sync engines 304), CIT-Cs will commonly vary across the various CUD 104-C participating in a Party.

As illustrated by Operation 422, based on the CTI-H and the CTI-C(s), the server sync engine 118 (alone or in conjunction with UD sync engines 304) adjusts content presentations across UDs participating in the given Party. For an implementation provides synchronization signals to the server conference engine 119 and/or to the conference engine 306 which adjust when a given WPC segment or element (or multiple WPC segments and/or elements) are provided to the CUDs 104-C participating in a Party. Two or more CTIC-Cs may be adjusted by the server sync engine 118 (alone or in conjunction with UD sync engines 304) such that a presentation time of a given primary content segment and/or of a given secondary content segment (or elements thereof) at two or more CUDs participating in a given Party is synchronized across the multiple CUDs and with the HUD also participating in the given Party. Such adjustments may occur on any basis such as a one-time, a recurrent, as needed, scheduled interval, randomly, or other basis. For an implementation, a delay period for a first CUD (a "CTI-C1") may be lengthened, shortened, or otherwise adjusted (e.g., content time skipped, reversed, or the like) to accommodate a delay period experienced by a second CUD (a "CTI-C2"), and vice versa.

As illustrated by Operation 424, a HUD 104-H and/or a PUD cooperate with the server sync engine 118 (operating alone or in conjunction with UD sync engines 304) identify, filter, curate, or otherwise select (herein, individually and collectively "curate") reactions. Such curation may include, for a non-limiting example, selecting user data 138 and/or background data 140 (from multiple instances thereof) to provide to other participating UDs 104 (for presentation to users thereof) at any given time during a Party. A PUD may identify how a given content is to be presented on one or more internal displays 330 and/or external displays 130 (as described below) coupled to UDs 104. The server sync engine 118 (alone or in conjunction with UD sync engines 304) may designate which UDs 104 may provide reactions during a Party and how such reactions and other WPC are to be presented to a user via a given UD 104. It is to be appreciated, WPC may be presented to different users, via different UDs 104, based upon characteristics of the UDs, user preferences, communications links utilized, and otherwise.

As illustrated by Operation 426, the server sync engine 118 may detect when a new HUD is needed and/or requested, for example, by an IUD or a CUD. If so, the process may proceed with Operation 406.

As illustrated by Operation 428, the server sync engine 118 may detect when a new PUD is needed and/or requested, for example, by an HUD, IUD, or a CUD. If so, the process may proceed with Operation 414.

As illustrated by Operation 430, the server sync engine 118 may detect when a new Party is to end. The ending of a Party may be based upon a request from a HUD or and IUD to terminate the Party, a scheduled end time, a cessation of a given primary content being available, or otherwise.

As illustrated by Operation 432, the server sync engine 118 may determine whether WPC and/or other information, such as synchronization information utilized, user preferences or other computer data associated with a given Party is to be saved.

As illustrated by Operation 434, when WPC and/or other information for a given Party is to be saved, the server sync engine 118 (alone and/or in conjunction with the server conference engine 119 and/or one or more content sources 107, HUDs 104-H, CUDs 104-C, and UD sync engines 304 and UD conference engines 306) facilitate the saving of the WPC or portions thereof and other information. Such saving may include use of storage provided on the server, UDs, the Cloud, or otherwise.

As illustrated by Operation 434, the server sync engine 118 (operating alone or in conjunction with UD sync engines 304) may terminate the Party. For at least one implementation, such terminating may include disconnection/de-establishing of the one or more sync links 110, conference links 112, primary content links 114 and/or secondary content links 116.

Server Conference Engine 119

A server conference engine 119 facilitates collaboration by and between users, via their respective UDs 104, during a Party (alone and/or in conjunction with UD conference engines 306) by establishing and communicating WPC over two or more conference links 112. Conference links 112 may be provided separate of the sync links 110 or provided jointly therewith. Conference links 112 facilitate the distribution of WPC during Parties.

Collaboration by and between users (via their respective UDs 104) during a given Party may be decoupled from one or more of a providing of primary content (by the content nodes 106 to the UDs 104) and/or any synchronization information used to facilitate synchronization of content presentations, as facilitated by the server sync engine 118. For example, a providing of cell phone reactions by and between UDs 104 may arise independently and be shared independently of other Party features and/or functions by use of the server conference engine 119 (alone and/or in conjunction with UD conference engines 306).

For an implementation, the server conference engine 119 (alone and/or in conjunction with UD conference engines 306) supports collaboration between users during a Party, via their respective UDs 104 and CCDs 134, in any humanly perceptible format; non-limiting examples including speech, video, text, emoticons, gestures, or otherwise. Conference links 112 and collaborative aspects of a Party may be established or unestablished at any time before, during, or after a given Party has been initiated by the server conference engine 119.

For an implementation, the server conference engine 119 (alone and/or in conjunction with UD conference engines 306) may leverage proprietary, custom, open source, or otherwise provided conferencing software applications and content distribution applications including, but not limited to, JITSI MEET, WEBEX, ZOOM, and otherwise.

For an implementation, the server conference engine 119 (alone and/or in conjunction with UD conference engines 306) utilizes conference data 204C provided, for example, by the server data store 204 to facilitate the providing of WPC during a Party. Conference data 204C may include any data and/or computer instructions which facilitate collaboration during a Party. Non-limiting examples of conference data 204C include communications sockets used by UDs 104, IP addresses for UDs, UD identifiers, such as MAC addresses, communications network settings used for one or more conference links 112 and otherwise. For an implementation, the server conference engine 119 (alone and/or in conjunction with UD conference engines 306) utilizes user data 204A to a facilitate collaboration during a KWP.

Various instances of conference data 204C may be stored in the server data store 204 and used by the server conference engine 119 in facilitating collaboration during a Party. Non-limiting examples of conference data 204C include type of connection, distance of a given UD 104 from the sync server 102, maximum available bandwidth for a given conference link 112, throughput for the conference link 112, latency, and other data. Conference data 204C may be provided for conference link 112-H/C used during a Party to the server sync engine 118 for use in synchronization of WPC providing and presentation during a Party.

For an implementation, the server conference engine 119 stores user communications during a given Party as conference data 204C in the server data store 204. Such conference data may be time stamped and/or otherwise synchronized with respect to a given primary content segment such that a later playback of the conference data and/or the given primary content segment may include the conference data corresponding to such given primary content segment, as such conference data was generated during the given Party. For example, a later viewing of the football program and a Party by an Nth user may include a presentation of the conference data arising between a HUD 104-H and a CUD 104-C during a prior arising Party. Such later synchronization and presentation of conference data 204C with primary content segments (and/or elements thereof) enable the user of the Nth CUD 104-C(N) to enjoy the prior arising Party at a later time and as if participating real-time in the Party occurring earlier.

A sub-conference link (not shown) may be provided as a sub-stream of the conference link 112. Data communicated over the sub-conference link may be adaptively bit-rate ("ABR") provided to the various users in a Party such that a user receives a given WPC at substantially the same time the user so reacted. The server conference engine 119 (alone and/or in conjunction with a UD conference engine 306 and/in coordination with the server sync engine 118) determines which data processing operations, such as ABR to apply to a given content segment or element thereof.

For example, a video camera focused upon a first user of a HUD 104-H may ABR stream images (and audio) of such first user to other second user's CUDs 104-C. A cell phone reaction of the first user, as presented to the second users, may be ABR at a different setting or level and processed so as to be in substantially simultaneous synch with the presentation of the given primary content segment that resulted in the given cell phone reaction. A subconference link may be configured to utilize higher speed communications links than are used to facilitate one or more of the conference links 112 such that cell phone reactions to primary content segments may be in substantially simultaneous synchronization with the content segment during a Party. Subconference links and/or conference links 112 may be provided using networks supporting high band 5G communications.

For an implementation, the server conference engine 119 (alone and/or in conjunction with UD conference engines 306) may be configured to adaptively identify, using artificial intelligence, machine learning, and the like which of multiple user data 138 being captured by one or more CCDs 134 to provide to other UDs, such as a CUD 104-C, during a Party. For example, an image of user A's face 138-A, as captured, e.g., by a host CCD 134-H may be identified by a server conference engine 119 as including watch party content segments that are to be communicated to one or more selected CUDs 104-C during one or more portions of a Party.

For another example, an image of user B's face 138-B, as captured, e.g., by a host CCD 134-H, may be identified by a server conference engine 119 for communication to other UDs, such as one or more CUDs 104-C, when a primary content segment satisfies one or more criteria. For example, a non-limiting criteria may include user B's data 138-B being communicated when a first team scores a goal as identified in a given primary content segment; another non-limiting criteria may be a given facial expression, such as when user B is speaking, grimacing, or otherwise; another non-limiting criteria may be based upon other secondary content, such as a noise, an indication of an event happening proximate to a given user, or otherwise.

For an implementation, the server conference engine 119 may be configured to modify one or more aspects of a given user data 138 and/or a given background data 140. For example, a user data 138 may include a logo of clothing manufacturer. Image portions (e.g., pixels) corresponding to such logo may be modified when the clothing manufacturer does not meet a given criteria—such as being a recognized promotor or sponsor of a given primary content, or otherwise. For example, a football match sponsored by NIKE may result in the server conference engine 119 obscuring logos presented in a user data 138 for other sponsors, such as ADDIDAS. A server conference engine 119 (alone and/or in conjunction with UD conference engines 306) may be configured to utilize artificial intelligence and/or machine learning to identify content to be obscured or otherwise modified for presentation to other UDs 104 during Party. For example, WPC segments containing abusive, offensive, pornographic, suggestive, violent, fakes, or other types of content may be identified by the server conference engine 119 (alone and/or in conjunction with UD conference engines 306) as being inappropriate and not provided to one or more UDs 104. For further example, UDs associated with a child may be precluded from receiving certain WPC segments, while UDs associated with an adult may not be so precluded.

For an implementation, the server conference engine 119 (alone and/or in conjunction with UD conference engines 306) modifies or otherwise adjusts one or more aspects of a given user data 138 and/or of a given background data 140 based upon any parameter or condition. For example, a user using a CCD 134 to capture their image while they travel about their house may desire for background images depicting their home and its contents not be provided to other UDs 104 during a Party. Essentially, a "green screen" or the like may be virtually provided by the server conference engine 119 (alone, by and/or in conjunction with UD conference engines 306) such that any such background images are replaced by another background image—such as a static background image. For an implementation, background data 140 may be replaced with one or more primary content segments, including primary content segments containing motion video or static images. For another implementation, a server conference engine 119 (alone and/or in conjunction with UD conference engines 306) may modify one or more aspects of a background data 140 and a user data 138 in relation thereto. For example, a given user's image may be superimposed on a given background image.

For an implementation, the server conference engine 119 (alone and/or in conjunction with UD conference engines 306) utilizes artificial intelligence and/or machine learning, e.g., in conjunction with user data, to identify and/or prioritize user data 138, background data 140 and/or other WPC to be provided to other UDs 104 during a Party. For example, an image of a coach, may be prioritized for providing to other UDs 104 over an image of a bench warmer, a retired participant, a fan, and/or a non-participant in a given sporting event being presented in one or more primary content segments during a Party.

Server Karaoke Engine 120

For an implementation of the present disclosure and to facilitate the providing, synchronization, timing and processing KSCs, KACs and Karaoke Content during a KWP, a server Karaoke engine 120 may be instantiated on the sync server 102, with a corresponding "Karaoke User Device" ("KUD") engine 305 being instantiated on the UDs 104 participating in a given KWP. The server Karaoke engine 120 may be configured to coordinate alone and/or in conjunction with the server sync engine 118 and/or the server conference engine 119 (and further alone and/or in conjunction with KUD engines 305, UD sync engines 304 and UD conference engines 306) communication and presentation of one or more of KACs, KSCs and Karaoke content to UDs 104. Such coordination may occur with any given level of synchronization. As discussed below, the level of synchronization may vary by UD, over time, by Karaoke content selected, based upon various CTIs, and otherwise.

Operations performed by a server Karaoke engine 120 (alone and/or in conjunction with operations performed by KUD engines 305) may initiated when a Party is initiated (as illustrated by Operation 400(A)). Operations by the server Karaoke engine 120 (alone and/or in conjunction with operations performed by KUD engines 305) may occur separately and/or in parallel with operations performed during a Party—such as those identified in the non-limiting and illustrative operations of FIGS. 4A and 4B.

As illustrated in FIG. 5, Operation 500, initiation of a KWP may include, for at least one implementation, initiation of a DFWP (as illustrated by Operation 400(B)). That is a Party, KWP and/or DFWP may occur simultaneously, in parallel, and where a given reaction may be one of a standard reaction, a KR, and/or a DFR. For example, a DFR may include a KR element that replaces (or Deepfake) a singer's voice, while a DFR includes an image of a user that is provided to replace/deepfake the singer's face.

As illustrated in Operation 502, a server Karaoke engine 120 (alone and/or in conjunction with a KUD engine 305) receives a request to designate a UD 104 as a KUD. A KUD is a user device that generates, using one or more CCDs 134, KRs (and for at least one implementation, KSCs) during a KWP. For at least one implementation, different UDs 104 may be designated as a KUD during a KWP and multiple UDs 104 may be designated as KUDs, at any given time, during a KWP. The server Karaoke engine 120 may receive (from one or more KUD engines 305) requests for a given UD to be designated as a KUD at a given time, with respect to a given Karaoke content or multiple Karaoke content, or otherwise. For an implementation, such requests may be communicated using the sync links 110 and the server sync engine 118 and corresponding UD sync engine(s) 304 on the one or more requesting UDs 104. The requesting UD(s) 104 may be HUDs 104-H and/or CUDs 104-C.

As illustrated in Operation 504, the server Karaoke engine 120 may deny the request to designate a given UD 104 as a KUD. When the request is denied, the process may continue with one or more WP operations (as, for example, per FIGS. 4A and 4B) and/or DFWP operations (as described below). It is to be appreciated that a request for a UD 104 to be designated as a KUP may occur at any time during a WP and/or a DFWP.

As illustrated in Operation 506, the server Karaoke engine 120 (in conjunction with a respective KUD engine 305) designates a given KUD as a Karaoke Presenter User Device (a "KPUD"). For at least one implementation, a KPUD is a combination of a KUD and a PUD. A KPUD may be designated to capture KRs during a given portion of a KWP (for example, when a given Karaoke content is being presented during a KWP). The Karaoke Content to which a KR is to be captured by a KPUD may be specified by the KPUD, a HUD, a CUD, or otherwise.

When so designated, the KPUD is granted presenter privileges, which facilitate the capturing and providing of the designated user's KRs to the sync server 102. For at least one implementation, a KPUD may also be configured to provide other reactions, such as reactions to other, non-Karaoke content. During a KWP, multiple KPUDs may exist at a given time and designated KPUDs may vary over time. When a KPUD is not designated during a KWP, the KWP defaults to a WP and/or, when the Party is so configured, as a DFWP. A KPUD is designated with respect to at least one Karaoke Content. The Karaoke Content may be selected by the KPUD, by a HUD 104-H, or by a CUD 104-C.

As illustrated in Operation 508, the server Karaoke engine 120 (in conjunction with one or more other KUD engines 305) queries a second UD 104 participating in a given Party (which may be formed initially as a WP, DFWP and/or a KWP) whether a user of a second UD 104 desires to participate in the KWP with the one or more designated KPUDs. If "NO," the process resumes at Operation 504.

As illustrated in Operation 510, if "Yes," the second UD 104 is designated by the server Karaoke engine 120 (and by their respective KUD engines 305) as a KUD. The process may then proceed to Operation 506, where the KUD may be designated as a KPUD, when KRs from the user of the second UD are to be captured.

As illustrated in Operation 512, and for at least one implementation, a KUD may be queried as to which KSCs, from one or more KPUDs, the KUD selects to receive and/or have presented to them during a KWP. It is to be appreciated that, during a KWP, KSCs from one or more certain KPUDs may be undesirable to a given KUD for any or no reason. For example, KSCs from certain KPUDs may be include secondary content objectionable to a user of the second KUD— e.g., the KSCs may include vulgar or offensive language. Thus, per Operation 512, KSCs may be filtered by KUDs by the selecting and/or unselecting of KPUDs from which KSCs are to be received. For an implementation, a HUD 104-H may select/deselect KPUDs for presenting/not presenting KSCs at any time during a Party. Further, it is to be appreciated that Operations 502-512 may occur at any time during a Party, such as when a new KPUD joins, when a KPUD's KSCs are objectionable (for any reason and/or at any time) or otherwise.

As illustrated by Operation 514, designations of acceptable/unacceptable, permitted/unpermitted (or otherwise) KPUDS and/or KSCs may be stored as one or more user preferences by the server Karaoke engine 120 (alone and/or in conjunction with a KUD engine 305) in the server data store 204 as user data 204A, and/or in a data store 310 as user data 312. Such user preferences may be utilized by the sync server 102 to filter KRs and/or KSCs, and/or by the server Karaoke engine 120 and/or by KUD engines 305, to filter KSR and/or KSCs. It being appreciated that for at least one implementation, KRs contain "raw" reactions while KSCs may contain processed versions of such KRs, such as those filtered by the server Karaoke engine 120 and/or the server conference engine 119 to not contain objectionable content.

As illustrated by Operations 516-526, for at least one implementation and during a KWP, KRs are captured by CCDs for a given KPUD and communicated to the server Karaoke engine 120 for further processing and distribution, as appropriate, as one or more KSCs to one or more KUDs for a given KWP. Herein, the description of such further processing operations is provided with respect to KRs from a KPUD, but such operations may occur to KRs received from multiple KPUDs in series, parallel, intermittently, per a schedule, or otherwise.

As illustrated by Operation 516, the server Karaoke engine 120 (alone and/or in conjunction with one or more KUD engines 305) associates a KPUD with a given Karaoke Content with respect to which the PKUD will provide one or more KRs. As described above, the KR corresponds to Karaoke content selected upon request, randomly, or otherwise by a KPUD, a HUD 104-H, a CUD 104-C, or otherwise.

As illustrated in Operation 518, the server Karaoke engine 120 requests and receives from a content source 107, a content provider 105, a content node 106, and/or from a data store, the KACs corresponding to the Karaoke content.

For example, the server Karaoke engine 120 may request and receive one or more KACs to providing lyrics, timing information, queues, or the like for associated Karaoke content. The KACs may be KPUD user specific, generic, or otherwise. For example, KACs for a child user may include a first set of age appropriate lyrics while KACs for an adult user may include as second set of non-age appropriate lyrics. For at least one implementation, KACs may be requested from a source and available for distribution by the server Karaoke engine 120 to a KPUD a minimum amount of time to account for one or more transmission, processing, presentation, user perception, return path, or other delays associated with one or more of the KACs, the Karaoke content and any KR. For an implementation, such delays may be quantified in view of one or more CTIs (as described below).

As illustrated in Operation 520, the server Karaoke engine 120 provides KAC(s) to one or more designated KPUDs. For at least one implementation, Operation 520 is accomplished prior to a presentation of a KC segment with respect to which the KPUD user is to provide one or more KRs—as captured by a CCD. For at least one implementation, a KPUD may instruct a CCD to capture a KR within less than one-half of a second after presenting a KAC to the KPUD user and for at least one implementation the capturing of the KR occurs substantially simultaneously with a presentation of the given KC segment to the KPUD user.

As illustrated in Operation 522, the server Karaoke engine 120 receives the KRs from the KPUD and retrieves KSIs (as provided by the KAC available to the sync server 120 and/or KSIs generated by the KPUD) and, based thereon, generates one or more KSCs. It is to be appreciated that a KSI generated by the KPUD may be substantially frame accurate whereas use of a KSI retrieved by the sync server 120 may be less accurate and may include a proximation of when a given KR is captured in response to a given KAC or otherwise. The KSC includes the KR plus KSI.

For an implementations, KSCs may be generated by a KPUD engine 305-K (where a KPUD engine 305-K is a KUD engine 305 that has been designated as a KPUD) from KRs captured by the KPUD and based on KSIs computed by the KPUD. The so generated KSCs may be communicated to the server Karaoke engine 120 separately, in lieu of, and/or in conjunction with the KRs and any KSIs.

As illustrated in Operation 524, the server Karaoke engine 120, in conjunction with the KUD engines designated to receive one or more KSCs from one or more designated KPUDs, synchronizes the presentation of the Karaoke content, KAC(s) and KSC(s) across the previously designated KUDs (such designations occurring, for example, per Operation 512). Various synchronization implementations may be used including, but not limited to, the implementations further described herein.

As illustrated in Operation 526, the process continues until the KWP is terminated. It is to be appreciated that one or more of the above and other Operations may occur during a KWP including, but not limited to, adding/dropping KUDs, (un)designating KPUDs, (un)designating KSCs to receive, and otherwise.

For at least one implementation, the server Karaoke engine 120 (in conjunction with respective KUD engines 305) synchronize presentations of KSC(s), KAC(s) and Karaoke content based upon one or more CTIs associated with a KPUD, such as a "content timing information—primary" ("CTI-P") which identifies when a given KC segment or a given DFC segment is received. Additional CTIs may be associated with a KPUDs including: a "content timing information—Karaoke augmented content" ("CTI-KAC") which identifies when a KPUD receives a KAC segment associated with a given KC segment; and a "content timing information—Karaoke reaction" ("CTI-KR") which identifies identifying when a KPUD receives, from a CCD, a KR in response to a given KAC segment. For an implementation, CTI-KRs may also be provided for a KR in response to a give KC segment.

One or more of the CTI-P, CTI-KAC and CTI-KR may overlap in whole or in part over a given time period. For at least one implementation, the CTI-KR may end after a longer of the CTI-P and the CTI-KAC. For an implementation, a CTI-P may begin before and/or occur concurrently with a CTI-KAC. For an implementation, a CTI-P occur before a CTI-KR.

For at least one implementation, a CTI-P, a CTI-KAC, and/or a CTI-KR may be associated with a standardized time designator, such as a UTC. A UTC may be used for the content timing information and determining a timing relationship between a given Karaoke content, KACs, KRs, and KSCs. A given UTC time may be uniquely associated with an identifiable portion of Karaoke content, as such when a given segment is received by a HUD 104-H, an identifiable portion of a KR, such as when captured by a KPUD's CCD 134, or otherwise.

For at least one implementation, a server Karaoke engine 120 may be configured to periodically receive CTI-Ps from the KPUD and based thereon determine timing relationships between a given Karaoke content, KACs and any KRs provided by a KPUD. Such timing relationships may vary over time. For an implementation, the server Karaoke engine 120, alone and/or in conjunction with one or more KUD engines 305, may be configured to receive timing information periodically from one or more KUDs and, based thereon, determine timing relationships to use in presenting Karaoke content, KACs and KSCs on KUDs 104 during a KWP. Such timing relationships may vary over time.

For an implementation, a CPI-KR may be expected to occur, and KRs may be expected to be received by the server Karaoke engine 120 within a given period. Such period may be pre-determined or determined on any basis.

The server Karaoke engine 120 may use an "ordinary time" to synchronize presentations of one or more of Karaoke content, KACs and KSCs. The ordinary time may be determined based on actual use, modeling, estimations, randomly, variably, iteratively, or otherwise. For at least one implementation, an "ordinary time" is an aggregate time, determinable over two or more periods for a given event to occur in view of an occurrence of at least one earlier occurring similar event. For example, a CPI-KR for a given KWP that includes a presenting of a given Karaoke content, may be based on an ordinary time determined in view of prior presentations of the given Karaoke content in prior KWPs. It is to be appreciated that a KR may be provided earlier, with or later than a given ordinary time for a given Karaoke content and a CPI-KR may be adjusted to reflect any such deviations or exceptions thereto. The ordinary time may be accelerated by the server Karaoke engine 120 (alone or in conjunction with KUD engines 305), for example, by raising an underlying beat, delayed, paused, or otherwise adjusted in view of adjustments to a presentation rate of a given one or more segments of a Karaoke content. Such segments may be synchronized by the server sync engine 118 (alone or in conjunction with UD sync engines 304) for presentation to KUD users during a KWP. The Karaoke content may be made available to a given KUD 104 by a content source 107 and/or by the server conference engine 119 (alone or in conjunction with UD conference engines 306) at any time. The server Karaoke engine 120 and server sync engine 118 (alone or in conjunction with KUD engine 305 and UD sync engines 304) may synchronize presentations of the Karaoke content with KACs and/or KSCs based upon an ordinary time or a determined variation therefrom—such variation may be then determined, random, variable, pre-determined or otherwise.

It is to be appreciated that a given user familiar with a given Karaoke content (such as lyrics or melody of a song) may result in a KR being captured and provided by a KPUD to the sync server 102 earlier than a second KR by a non-familiar user is captured. A CPI-KR may occur prior to or later than an ordinary time associated with a given Karaoke content.

A KR may be captured by a CCD associated with a KPUD and provided by the KPUD to the sync server 102. The KSC derived from the KR may also be provided to other KUDs 104. The other KUDs 104 may or may not receive a corresponding KAC. For example, a well-known song, like QUEEN's "We are the Champions" may result in KRs of "We will Rock You" being captured as KRs by a given KPUD without the KPUD user receiving a KAC providing the lyrics, timing, melody, notes or otherwise that correspond to the Karaoke content. For other instances of Karaoke content, lyrics in a textual format and timing queues, such as those provided by visible indicators, musical scores, or the like might be needed by a given KPUD user in advance such that better synchronization of KRs to the Karaoke content and/or to the KACs may occur.

For at least one implementation, a CPI-KAC may have a correspondingly shorter time period than may be expected when viewed based on an ordinary time for the Karaoke content, as identified by a CTI-P. For such an implementation, CIP-KC may be less than a CTI-P for a given Karaoke content.

For at least an implementation, during a KWP a user's vocals may be received within a few tenths of a second of when such vocals would otherwise be indicated to be provided by a musical score or other timing information. For at least one implementation, the server Karaoke engine 120 (and corresponding KUD engines 305) may be configured to "look ahead" of a current segment of a given Karaoke content to identify one or more KACs to present to the KPUD user in conjunction and/or in synchronization with when a later occurring segment of the Karaoke content that is to be presented, as indicated, for example, by a musical score or other source of content timing information and a correspondence identified between the given KAC and the given Karaoke content segment.

For at least one implementation of a KWP, the Karaoke content and corresponding KAC may be specifically configured for use during a KWP. For example, the Karaoke content may include a backing track and one or more scrolling or otherwise appearing lyrics (KACs), which are presented together to a KPUD user in a given Karaoke content. For such an implementation, the server Karaoke engine 120 (and a corresponding KUD engine 305) may not be needed, and a KRs may be captured and communicated by the KPUD to the sync server 102 in an ordinary manner in which other reactions (non-KRs) are captured and communicated to other UDs during a WP and/or during a DFWP.

For another implementation of a KWP, the KAC may be any content segment with respect to which information sufficient for use as a KAC is available. That is the KAC may take any form. For example, a KAC may include closed captioning or similar information which provides a visible representation of one or more words, sounds or the like appearing in the given Karaoke content. For recorded content and for at least one implementation, KACs may be based on closed captioning information provided with a given Karaoke content. Such closed captioning information may be provided in a separate instance of computer data and may include synchronization information which the server Karaoke engine 120 (alone or in conjunction with KUD engines 305) coordinates a presentation, on a KPUD, of a given closed caption text, or the like, with a given segment of the Karaoke content. For "live" content, KACs may be based on phonics inputted by a stenographer. The stenographer may be a person and/or an automated stenography process provided by the sync server 102, on the Cloud, or otherwise. For at least one implementation, a CTI-P and a CPI-KAC may be substantially equal in length, with minimal delays occurring due to differences in data transmission delays between a given content link 114 and a given sync link 110 with a given KPUD.

For at least one implementation where "live" primary content is being presented and stenography is being used, a delay may occur based upon when a given Karaoke content segment is available at a KPUD (for example, as represented by a CTI-P) and when KACs associated therewith are available at the KPUD (for example, as represented by a CTI-KAC). The server Karaoke engine 120 may receive such CTIs from the given KPUD engine 305-K.

For at least one implementation, the CTI-P and CTI-KAC processing delays may be accommodated by the server Karaoke engine 120 (in coordination with participating KUD engines 305), such that presentations of a given Karaoke content segment is delayed on the KPUD until corresponding KACs (as based, example, on outputs from a stenographer) are available at the KPUD. Presentations of the Karaoke content segments on other KUDs may also be coordinated by the server Karaoke engine 120 (alone or in conjunction with the participating KUD engines 305) so as to facilitate substantially simultaneous synchronization of a given Karaoke content segment with a given KSC across two or more participating KUDs. The server Karaoke engine 120 may be configured to instruct KUDs (via their respective KUD engines 305) to delay presentations of the given Karaoke content until one or more of the Karaoke content, the KAC, and the KSCs are available for substantially simultaneous presentation during a KWP to two or more KUD users. For at least one implementation, such coordinating may include use of one or more of a CTI-P, a CTI-KAC, and a CTI-KR.

For an implementation of a KWP where multiple KPUDs exist, a given KPUD may, at a given time, have a CTI-P, a CTI-KAC, and a CTI-KR associated with it. One or more of such CTIs may be common or different across one or more of the KPUDs. Such CTIs may further vary over time and with respect to different Karaoke content segments, KACs and/or KSCs. For example, if the providing of a given KAC to a given KPUD is delayed, at a given time, than a corresponding KSC will potentially also be delayed. Accordingly, it is to be appreciated that tremendous variability may arise in CTIs associated with various KPUDs at any given time and during a KWP with multiple KPUDs at a given time.

For at least one implementation, the server Karaoke engine 120 coordinates KWP content presentations across two or more KUDs by using a priority scheme, wherein CTI-Ps, CTI-KACs, and CTI-KRs for a designated host KPUD are used to determine when KSCs provided by other non-host KPUDs are to be presented across two or more KUDs participating in the given KWP.

For another implementation, the server Karaoke engine 120 coordinates KWP content presentations across two or more KUDs by using a common CTI scheme, wherein averages of CTI-Ps, CTI-KACs, and CTI-KRs for a first KPUD and one or more second KPUDs are used to determine when KSCs provided by the first KPUD and the second KPUDs are to be presented at the two or more KUDs participating in the given KWP.

For another implementation, the server Karaoke engine 120 coordinates KWP content presentations across two or more KUDs by using artificial intelligence and machine learning techniques which, based upon iterative representations of Karaoke content and multiple KSCs facilitate a presentation of Karaoke content and multiple KSCs in a best-case synchronization format.

For example, using artificial intelligence and machine learning techniques, the server Karaoke engine 120 may determine over multiple iterations of KACs and with respect to a given Karaoke content segment, that the sync server 102 receives first KRs, from a given first KPUD, one-tenth ($\frac{1}{10}^{th}$) of a second later than second KRs are received by the sync server, while third KRs are received one-tenth ($\frac{1}{10}^{th}$) of a second earlier than the second KRs. Under such an example, the server Karaoke engine 120 may be configured to not delay presentations of the first KPUDs KSC, delay the second KPUD's KSCs by one-tenth ($\frac{1}{10}^{th}$) of a second, and delay the third KPUD's KSCs by two-tenth's ($\frac{2}{10}$ths) of a second (while further accounting for any KR to KSC processing delays).

For another implementation, where KRs for a given "hopelessly out of synch" KPUD are commonly out of synch with other KRs for other KPUDs, the server Karaoke engine 120 (alone or in conjunction with one or more of the KUD engines 305) may be configured to present such "hopelessly out of synch" KSCs on a selection, if any, of participating KUDs. For example, the "hopelessly out of synch" KSCs may be presented on the KPUD generating the "hopelessly out of sync" KRs, while not being presented or used in determining synchronizations of KRs (and corresponding KSCs) from other KPUDs.

It is to be appreciated that other synchronization schemes may be used by the server Karaoke engine 120 (alone or in conjunction with the KUD engines 305) to facilitate, as best as is reasonably possible, substantially simultaneous presentations of Karaoke content and multiple KSCs on multiple KUDs during a KWP. The server Karaoke engine 120 (alone or in conjunction with the KUD engines 305) determine which of one or more of a CTI-P, a CTI-KAC, and a CTI-KR associated with the multiple KPUDs to utilize at any given time for a given KWP.

The server Karaoke engine 120 (alone or in conjunction with KUD engines 305) may be configured to receive KWP timing information from a host KPUD on a different periodicity than KWP timing information is received from one or more non-host KPUDs and/or from one or more KUDs. The server Karaoke engine 120 (alone or in conjunction with KUD engines 305) may be configured to receive KWP timing information from any given KUD 104 participating in a given KWP on any basis, periodicity, or otherwise. Such KWP timing information may be provided by KUD engines 305, approximated by the server Karaoke engine 120 based upon WP CTIs, or otherwise.

The server Karaoke engine 120 (alone or in conjunction with KUD engines 305), may be configured such that KWP segments (Karaoke content and KSCs), are communicated to the two or more KUDs 104 on a real-time or other basis. For example, delays arising with the communication, processing, and/or presenting of given KWP segments, by a given KUD 104 may be addressed (if addressable) such that the presentation of one or more future arising KWP content segments continues to occur substantially simultaneously on other KUDs and with respect to a presentation thereof on a given KPUD. The server Karaoke engine 120 (alone or in conjunction with KUD engines 305), may be configured to facilitate synchronization of KWP segments such that presentation thereof occurs substantially simultaneously on a KPUD and at least one KUD.

The server Karaoke engine 120 (alone or in conjunction with KUD engines 305), may be configured to adjust presentations of Karaoke content segments by one or more KUDs in view of CTIs provided by a host KUD, which may be a KPUD or a KUD. Such adjustments may occur so that the presentation of a Karaoke content segments by the host KUD is at one or more of a quality setting, a minimum quality setting, a maximum quality setting, or otherwise.

The server Karaoke engine 120 (alone or in conjunction with KUD engines 305), may be configured to use sync data 204B including, but not limited to, CTIs provided by one or more KUDs 104. Sync data 204B may also include computer instructions used to facilitate synchronization of Karaoke content with KSCs during a KWP. Non-limiting examples of sync data 204B may include communications sockets used by KUDs to connect with a content provider 105 and/or a content node 106, IP addresses for KUDs, KUD identifiers, such as MAC addresses, communications network settings used for one or more of the content links 114, sync links 110, and otherwise. The server Karaoke engine 120 (alone or in conjunction with KUD engines 305), may be configured to use user data 204A to a facilitate synchronization of Karaoke content with KSCs during a KWP. Non-limiting examples of user data 204A include user demographic information, KUD information such as capabilities, technologies supported, and the like by a given KUD, user preferences, user viewing histories, and the like.

A sync link 110 used at a given time during a KWP may physically and/or virtually change for any reason, such as when a physical or virtual location of a given KUD changes and/or one or more properties of a CCD link 136 changes. For example, a KUD may connect to a first sync server 102 from a home location using a high-speed Internet connection. During a second KWP, such KUD may connect to the sync server 102 using a 4G cellular connection. Similarly, a CCD 134 may change location as a user moves throughout a house or otherwise. Such changes in location, connections, network properties, or otherwise may result in a decrease or increase of one or more characteristics of a CCD link 136, such as bandwidth used, latency, signal interference, or otherwise. Such change may impact CTIs. Accordingly, it is to be appreciated that the server Karaoke engine 120 (alone or in conjunction with the KUD engines 305) may determine which sync data 204B to use at any given time during a KWP and the frequency of which such determining is occur. For example, a KWP with a mobile KPUD may use more frequent determinations of which sync data 204B to use than may occur with a stationary KPUD. Sync data 204B determinations may vary based upon one or more characteristic of communications links used by a given KUD 104 to connect to with the sync server 102. Sync data 204B may be used by the sync server 102 in initially configuring the sync link 110 between the sync server 102 and a given KUD and in reconfiguring, such as by adjusting a bitrate utilized, the sync link 110 used, or other connection parameters during the KWP to facilitate substantially simultaneous presentation of Karaoke content, KACs and/or KSCs by multiple KUDs during a KWP.

Other synchronization approaches may be used for other implementations of the present disclosure.

Server Deepfake Engine 121

For an implementation of the present disclosure and to facilitate the providing, synchronization, timing and processing of primary content segments and DFRs during a DFWP, a server Deepfake engine 121 may be instantiated on the sync server 102, with corresponding "Deepfake User Device" ("DFUD") engines 307 being instantiated on UDs 104 participating in a DFWP.

The server Deepfake engine 121 may be configured to coordinate, alone and/or in conjunction with the server sync engine 118 and the server conference engine 119 (and further alone and/or in conjunction with one or more UD Deepfake engines 307), communication and presentation of content segments (herein, "Deepfake Content" ("DFC")) and related DFSC segments, such that one or more of DFTs in the DFC segments are replaced by one or more DFSC segments. The DFSC segments may be generated based on DFRs captured by a CCD associated with a Deepfake Presenter User Device (a "DFPUD"). The DFSC segments may be provide to other DFUDs at substantially simultaneously as the DFC is provided so as to facilitate supposition of images of a DFT with images of a DFS and thereby facilitate a DFWP experience. As discussed below, the level of synchronization between DFCs, DFTs and DFSCs may vary by DFUD, over time, by DFT(s) selected, by DFS(s) selected, based upon various CTIs, and otherwise.

Operations performed by a server Deepfake engine 121 (alone and/or in conjunction with operations performed by UD Deepfake engine 307) may initiated when a Party is initiated (as illustrated by Operation 400(B)). Operations by the server Deepfake engine 121 (alone and/or in conjunction with operations performed by UD Deepfake engine 307) may occur separately and/or in parallel with operations performed during a Party—such as those identified in the non-limiting and illustrative operations of FIGS. 4A and 4B.

As illustrated in FIG. 6, Operation 600, initiation of a DFWP may include, for at least one implementation, initiation of a KWP (as illustrated by Operation 400(A)). That is a Party, KWP and/or DFWP may occur simultaneously, in parallel, and where a given reaction may be one of a standard reaction, a KR, and/or a DFR. For example, a DFR may include a KR element that replaces (or Deepfake) a singer's voice, while a DFR includes an image of a user that is provided to replace/deepfake the singer's face.

As illustrated in Operation 602, a server Deepfake engine 121 (alone and/or in conjunction with a UD Deepfake engine 307) receives a request to designate a UD 104 as a DFUD. As described above, a DFUD is a UD 104 that generates DFRs, using one or more CCDs 134, (and for at least one implementation, converts DFRs, based upon one or more selected DFSs into DFSCs) during a DFWP. For at least one implementation, different UDs 104 may be designated as DFUDs during a DFWP and multiple UDs 104 may be designated as DFUDs, at any given time, during a DFWP. A DFUD may or may not correspond to a given DFS. The server Deepfake engine 121 may receive (from one or more UD Deepfake engines 307) requests for a given UD to be designated as a DFUD at a given time, with respect to a given DFC, multiple DFCs, a given DFS, multiple DFSs, a given DFT, multiple DFTs, or otherwise. For an implementation, such requests may be communicated using the sync links 110 and the server sync engine 118 and corresponding UD sync engine(s) 304 on the one or more requesting UDs 104. The requesting UD(s) 104 may be HUDs 104-H and/or CUDs 104-C.

As illustrated in Operation 604, the server Deepfake engine 121 may deny the request to designate a given UD 104 as a DFUD. When the request is denied, the process may continue with one or more WP operations (as, for example, per FIGS. 4A and 4B) and/or KWP operations. It is to be appreciated that a request for a UD 104 to be designated as a DFUD may occur at any time during a WP, a KWP, and/or a DFWP.

As illustrated in Operation 606, the server Deepfake engine 121 (alone and/or in conjunction with a respective UD Deepfake engine 307) designates a given DFUD as a Deepfake Presenter User Device (a "DFPUD"). For at least one implementation, a DFPUD is a combination of a DFUD and a PUD. A DFPUD captures DFRs during a DFWP, for example, when a given DFT is presented in a given DFC during a DFWP. The DFC and/or DFTs to which a DFR may be captured by a DFUD may be specified by the DFPUD, an DFUD, a HUD, a CUD, or otherwise. A DFR, as captured, may correspond to a given DFS, a selected DFS, or otherwise. A DFS may or may not be associated with a given DFPUD. For example, a first DFPUD may capture a DFR of a first person and such DFR may be used by the server Deepfake engine 121 (alone and/or in conjunction with a respective UD Deepfake engine 307) to generate a DFSC that is based on a DFS for a second person or a second entity (such as a pet), a combination of DFSs, or otherwise.

When so designated, the DFPUD is granted presenter privileges, which facilitate the capturing and providing of DFRs to the sync server 102. For at least one implementation, a DFPUD may also be configured to provide other reactions, such as reactions to other content. During a DFWP, multiple DFPUDs may exist at a given time and designated DFPUDs may vary over time. When a DFPUD is not designated during a DFWP, the DFWP defaults to a WP and/or, when the Party is so configured, to a KWP. A DFPUD may be designated with respect to at least one DFC and with respect to at least one DFT presented in such DFC(s).

As illustrated in Operation 608, the server Deepfake engine 121 (in conjunction with one or more other UD Deepfake engine 307) queries a second UD 104 participating in a given Party (which may be formed initially as a WP, KWP and/or a DFWP) whether a user of a second UD 104 desires to participate in the DFWP with the one or more designated DFPUDs. If "NO," the process resumes at Operation 604.

As illustrated in Operation 610, if "Yes," the second UD 104 is designated by the server Deepfake engine 121 (and by their respective UD Deepfake engine 307) as a DFUD. The process may then proceed to Operation 606, where one or more DFUDs may be designated as DFPUDs and from which DFRs are to be captured.

As illustrated in Operation 612, and for at least one implementation, a DFUD may be queried as to which DFSCs, from one or more DFPUDs, the DFUD selects to receive and/or have presented to them during a DFWP. It is to be appreciated that, during a DFWP, DFSCs from one or more certain DFPUDs may be undesirable to a given DFUD for any or no reason. Per Operation 612, DFSCs may be filtered by DFUDs by the selecting and/or unselecting of DFPUDs from which DFSCs are to be received. For an implementation, a HUD 104-H may select/deselect DFPUDs for presenting/not presenting DFSCs at any time during a Party. Further, it is to be appreciated that Operations 602-612 may occur at any time during a Party, such as when a new DFPUD joins, when a DFPUD's DFSCs are objectionable (for any reason and/or at any time) or otherwise.

As illustrated by Operation 614, designations of acceptable/unacceptable, permitted/unpermitted (or otherwise) DFPUDS and/or DFSCs may be stored as one or more user preferences by the server Deepfake engine 121 (alone and/or in conjunction with a UD Deepfake engine 307) in the server data store 204 as user data 204A, and/or in a data store 310 as user data 312. Such user preferences may be utilized by the sync server 102 to filter DFRs and/or DFSCs, and/or by the server Deepfake engine 121 and/or by UD Deepfake engines 307, to filter DFRs and/or DFSCs. It being appreciated that for at least one implementation, DFRs contain "raw" reactions while DFSCs may contain processed versions of such DFRs, such as those filtered by the server Deepfake engine 121 and/or the server conference engine 119.

As illustrated by Operations 616-630, for at least one implementation and during a DFWP, DFRs are captured by CCDs for a given DFPUD and communicated to the server Deepfake engine 121 for further processing and distribution, as appropriate, as one or more DFSCs to replace one or more DFTs with a DFSs during a DFWP. Herein, the description of such further processing operations is provided with respect to DFRs from a DFPUD, DFTs and DFS and DFCs. Such operations may occur to DFRs, DFTs, DFSs, and DFCs in series, parallel, intermittently, per a schedule, or otherwise.

As illustrated by Operation 616, the server Deepfake engine 121 (alone and/or in conjunction with one or more UD Deepfake engine 307) is provided with an identification of the DFC with respect to which one or more DFTs are to be identified and replaced with one or more DFSs during a DFWP. The DFC may correspond to content selected upon request, currently being presented, scheduled to be later presented, or otherwise. Selection of the DFC may be made by a DFPUD, a HUD 104-H, a CUD 104-C, by the sync server 102, or otherwise.

As illustrated by Operation 618, the server Deepfake engine 121 obtains meta data, when available, for the identified DFC. Such meta data may identify one or more DFT(s) in the DFT. For at least one implementation, the DFT(s) may identified on any basis including, but not limited to, a frame accurate basis for a DFC. For at least one implementation, the DFT(s) may be identified on a pixel and/or group of pixel basis within a frame or other segment or element of the DFC. Any known or later arising process, system or device, for identifying occurrences of DFT(s) in a DFC may be used.

As illustrated by Operation 620, the server Deepfake engine 121 (alone and/or in conjunction with one or more UD Deepfake engine 307) receives an identification of one or more DFT(s) with respect to which DFRs are to be generated by one or more DFPUDs during a DFWP. For example, a first user of a first DFPUD may desire to provide first DFRs for a first actor in the DFC while a second user of the first DFPUD and/or a second DFPUD may desire to provide second DFRs for a second actor in the DFC.

As illustrated by Operation 622, the server Deepfake engine 121 obtains and/or generates models for the selected DFTs. For at least one implementation, the server Deepfake engine 121 may include a Deepfake video editor that utilizes a neural network executing, for example, on one or more servers, on a given device, in the Cloud, or otherwise to generate models for DFTs. Such models may be provided as one or more DFACs segments which facilitate substitutions of DFTs with DFSCs (as based on one or more DFRs and DFSs).

The neural network may use one or more autoencoders to generate the DFACs for given DFTs. For an implementation, the DFTs chosen may be as identified by a DFPUD, for example using a touch screen input, a stylus input, or otherwise, by meta data provided with the given content, such as meta data identifying a list of actors in a video presentation, or otherwise. For an implementation, the Deepfake video editor may utilize generative adversarial networks ("GANs") and/or other later arising devices, systems and processes to generate DFACs for selected DFTs. The autoencoder reduces a DFT (and a DFS, when so applied thereto) into one or more lower dimensional latent spaces—the latent space(s) identifying one or more key "characteristics" of a DFT's (and, when so applied to a DFS) image and/or likeness. Non-limiting examples of such "characteristics" include facial features, body position, body movements (from image to image), and the like. The latent space(s) may also identify aspects of other subjects presented in a given frame or frames of the given content. For example, the image and/or likeness of other persons, objects (e.g., pets and cars), backgrounds (e.g., nature and city scenes), or the like (herein, "secondary DFTs"). The DFTs and any secondary DFTs may be used by the server Deepfake engine 121 (alone and/or in conjunction with one or more UD Deepfake engine 307) to replace, in a given DFC, DFTs with DFSs on a frame accurate basis during a DFWP.

For at least one implementation, where models for a DFT have been previously generated, such models may be used in addition to the above described processes.

One or more models of one or more DFTs may be used by the neural network to identify one or more characteristics thereof. The DFT model(s) may be generated using an autoencoder or known and/or later arising techniques. The model(s) may also identify aspects of other secondary DFTs. For example, the image and/or likeness of other persons, objects (e.g., pets and cars), backgrounds (e.g., nature and city scenes), or the like that are to be inserted into a given content in lieu of a target. It is to be appreciated that a secondary DFT may include characteristics of a DFT, amalgamations of multiple DFTs (e.g., a human face superimposed on a horse's body and provided in a model as a secondary DFT), or the like.

As illustrated by Operation 624, the server Deepfake engine 121 obtains and/or generates models for the selected DFSs. For at least one implementation, the above described processes for obtaining models for DFTs may be used—as applied to a given DFS. A DFWP may include the replacing of one DFTs with one DFSs. For example, a primary content depicting a choir singing may identify an image of a first singer as a primary DFT that is replaced during a DFWP with an image of a first DFS. For another example, images of multiple choir members (e.g., a first DFT, a second DFT, or an Nth DFT) may be replaced with a DFT's image and/or multiple secondary to Nth DFS's images (provided models exist for the secondary to Nth DFSs). For example, two or more choir member's image (e.g., a DFT) may be replaced by a DFS image or by multiple DFS images. The DFTs whose images/likeness are to be replaced by DFSs may be originally presented in any content, including primary content and secondary content.

As illustrated by Operation 626, the server Deepfake engine 121 (alone and/or in conjunction with one or more UD Deepfake engine 307) establishes associations between DFPUD(s) that will be providing DFRs in response to one or more DFTs in a given DFC and with respect to at least one DFS.

As illustrated by Operation 628, the server Deepfake engine 121 receives the DFPC(s) and forwards the relevant DFPC(s) to the DFPUD(s), as set forth by the associations established in Operation 626. The sync server 102 may forward the DFPC(s) at any given level of synchronization with the DFC.

As illustrated by Operation 630, the server Deepfake engine 121 (alone and/or in conjunction with one or more UD Deepfake engine 307) receives one or more DFRs. For at least one implementation, the DFRs are received by the sync server 102 such that synchronization of a providing of the DFC and any DFSCs to other DFUDs may occur substantially simultaneously. Accordingly, it is to be appreciated that Operations 628 and 630 occur, for at least one implementation, such that DFPC(s) identifying instances of a given DFT in the DFC are identified to the associated DFPUD that is to provide one or more DFRs with sufficient time for a user of such DFPUD to recognize the DFT, for the user to react, for the CCD and DFPUD capture a DFR, and for the sync server 102 to receive the DFR so that it converted into a DFSC based upon a selected DFS that has been associated DFT and DFC. For at least one implementation, conversions of DFRs into DFSCs based upon a selected DFS may occur at a DFPUD, using a UD Deepfake engine 307.

As illustrated by Operation 632, the server Deepfake engine 121 receives the DFRs from the DFPUD and, based thereon, generates one or more DFSCs. For an implementations, DFSCs may be generated by a UD Deepfake engine 307 from DFRs captured by the DFPUD. The so generated DFSCs may be communicated to the server Deepfake engine 121 separately, in lieu of, and/or in conjunction with the DFRs.

For at least one implementation, DFSCs may be generated by one or more decoders provided by a Deepfake video editor. The decoders may be used to replace a DFT's image/likeness with a DFS's image/likeness, and in view of the DFRs captured by the DFPUD. For at least one implementation, the decoders may use the latent space(s) generated for the DFTs (as per Operation 622) and the model(s) generated/obtained (as per Operation 624) for the DFS(s) to perform such replacements. More specifically and for at least one implementation, using modeling characteristics, a decoder can generate a new image based on one or more models specific to a given DFS. The DFS's characteristics, as per the model(s) may then be superimposed onto the face, body, etc. of the DFT—as represented in the latent space(s).

As illustrated in Operation 632, the server Deepfake engine 121 (alone or in conjunction with the DFUD engines designated to receive one or more DFSCs from one or more designated DFPUDs), synchronizes the presentation of the DFC and DFSC(s) across the previously designated DFUDs (such designations occurring, for example, per Operation 610). Various synchronization implementations may be used including, the implementations described above with respect to the synchronization of Karaoke content with KSCs.

As illustrated in Operation 634, the process continues until the DFWP is terminated. It is to be appreciated that one or more of the above and other Operations may occur during a DFWP including, but not limited to, adding/dropping DFUDs, (un)designating DFPUDs, (un)designating DFSCs to be received, identifying/selecting new or different DFTs and/or DFSs, associating DFRs from a given DFPUD with one or more DFCs, DFTs, and/or DFSs, and otherwise.

For one non-limiting, example, the server Deepfake engine 121 (alone and/or in conjunction with one or more UD Deepfake engine 307) may be configured to instruct a content provider 105 to communicate one or more DFC segments to a DFPUD before communicating such DFC segments to other DFUDs such that the given DFCs are presented to the user of the DFPUD a given time interval before the given DFC segment and a DFSC associated there with is presented to another DFUD.

For an implementation of a DFWP, the server Deepfake engine 121 (alone and/or in conjunction with one or more UD Deepfake engine 307) may be configured to adjust presentations of primary content, DFSCs and/or DFRs based upon one or more CTI-Ps and "content timing information—Deepfake reaction" ("CTI-DFR") which indicates when a DFPUD outputs a DFR in response to a DFC segment.

One or more of the CTI-P and CTI-DR may overlap in whole or in part over a time period. For at least one implementation, the CTI-DR may end after a longer of the CTI-P. For an implementation, a CTI-P may begin before and/or occur concurrently with a CTI-DR. For an implementation, a CTI-P occur before a CTI-DR.

The server Deepfake engine 121 may be configured to periodically receive CTI-Ps from the DFPUD and based thereon determine timing relationships between a given DFC, DFT and a given DFR. Such timing relationships may vary over time. The server Deepfake engine 121 (alone and/or in conjunction with the server sync engine 118 and/or one or more UD Deepfake engine 307) may be configured to receive CTI-Ps and CTI-DRs, from one or more DFPUDs and based thereon determine timing relationships to use during a DFWP in synchronizing the providing of a DFC segment and DFSCs across two or more DFUDs participating in a given DFWP. Such timing relationships may vary over time.

For at least one implementation, a CTI-P and/or a CTI-DR may be identified by a UTC. The UTC may be used for the DFC timing information and determining a timing relationship between a DFC segment and a DFR. A given UTC time may be uniquely associated with an identifiable portion of a DFC segment, as such when a given primary DFC segment is received by the DPFUD or other identifiable portion of a DFWP content segment, such as when DFRs are captured by a DPFUD's CCD 134 or otherwise. A non-limiting example of a uniquely identifiable portion of a primary content segment includes a frame of A/V content capable of being independently rendered by a UD 104, such as an "I" frame in a motion pictures expert group ("MPEG") group of pictures ("GOP"). For at least one implementation, MPEG compression algorithms and the like may be used for identifying frames of watch party content, as captured by a CCD 134.

For at least one implementation of a DFWP, a DFC, DFT and/or DFS may be specifically configured by the server Deepfake engine 121 for use during a DFWP. For example, the DFC may include identifiable portions therein that correspond to DFTs. For example, an action movie starring Tom Cruise, may include DFT designators identifying where Tom Cruise's image and/or likeness (as may occur when a stunt double is used) occurs in the DFC. Such DFTs may be presented to a DFPUD user in a format which facilitates such user providing one or more actions which are captured as one or more DFRs in substantial synchronization with the DFC content itself.

For another implementation of a DFWP, the DFC may be any content segment with respect to which information sufficient for generating a DFR may be obtained. For example, a given DFC may include closed captioning or similar information which provides a visible representation of one or more images, sounds or the like appearing in the given DFC. For recorded content and for at least one implementation, DFRs selected for presentation by a server Deepfake engine 121 (alone or in conjunction with the server conference engine 119 and/or one or more UD Deepfake engines 307) may be based on closed captioning information provided with the given DFC. Such closed captioning information may be provided in a separate instance of computer data and may include synchronization information which coordinates a presentation of the given closed caption text and the like, with a given DFC segment and any DFSs associated therewith. For "live" content, DFT designators may be based on phonics inputted by a stenographer. The stenographer may be a person and/or an automated stenography process provided by the sync server 102, on the Cloud, or otherwise.

For at least one implementation where "live" primary content is being presented and stenography is being used, a processing delay may occur based upon when a given DFC segment is available and when DFRs associated therewith are captured and communicated to the server Deepfake engine 121 for incorporation with one or more DFS models to generate DFSCs. For at least one implementation, such processing delays may be accommodated by the server Deepfake engine 121, alone and/or in conjunction with the server sync engine 118 and/or one or more UD Deepfake engines 307, instructing one or more other DFUDs to delay a presentation of a given DFC segment until the associated DFRs are processed and associated DFSCs are generated and provided for presentation on the other DFUDs.

For at least one implementation, the server Deepfake engine 121 alone and/or in conjunction with the server sync engine 118 and the server conference engine 119 (and further alone and/or in conjunction with one or more UD Deepfake engines 307) may instruct DFUDs to delay presentations of the given DFC segment and one or more DFSCs associated therewith are available for substantially simultaneous presentation on the DFUD during a DFWP. For at least one implementation, such coordinating may include use of one or more of a CTI-P and a CTI-DR.

The server Deepfake engine 121, may be configured such that a given DFSC is communicated to the two or more DFUDs on a substantially real-time basis with the communication of the DFC by a content source 107 or otherwise. For example, latency, other delays, and/or other issues arising with the communication, processing, and/or presenting of a given DFC segment and an associated therewith DFSC by a given DFUD may be addressed (if addressable) such that the presentation of future arising DFC segments and DFSCs occur substantially simultaneously on a given DFUD with respect to a presentation thereof on a host DFUD. The server Deepfake engine 121, alone and/or in conjunction with the server sync engine 118 and the server conference engine 191 (and further alone and/or in conjunction with one or more UD Deepfake engines 307), may be configured to facilitate synchronization of DFC segments and DFSCs such that the presentation thereof occurs substantially simultaneously across two or more DFUDs.

For at least one implementation, a server Deepfake engine 121 may be configured to periodically receive CTI-Ps from the DFPUD and based thereon determine timing relationships between a given DFC, DFPCs, DFSCs and DFRs generated by a DFPUD. Such timing relationships may vary over time. For an implementation, the server Deepfake engine 121, alone and/or in conjunction with one or more UD Deepfake engines 307, may be configured to receive timing information periodically from one or more DFUDs and, based thereon, determine timing relationships to use in presenting DFC segments and the like during a DFWP. Such timing relationships may vary over time.

For an implementation, a CPI-DFR may be expected to occur with a given period, and DFRs may be expected to be received by the server Deepfake engine 121 within a given period. Such period may be pre-determined or determined on any basis.

The server Deepfake engine 121 may use an "ordinary time" to synchronize presentations of one or more of DFC segments and DFSCs. The ordinary time may be determined based on actual use, modeling, estimations, randomly, variably, iteratively, or otherwise. For at least one implementation, an "ordinary time" is an aggregate time, determinable over two or more periods for a given event to occur in view of an occurrence of at least one earlier occurring similar event. For example, a CPI-DFR for a given DFWP that includes a presenting of a given DFC segment, may be based on an ordinary time determined in view of prior presentations of the given DFC segment and DFSCs in prior DFWPs. It is to be appreciated that a DFR may be provided earlier, with or later than a given ordinary time for a given DFC segment and a CPI-DFR may be adjusted to reflect any such deviations or exceptions thereto. The ordinary time may be accelerated by the server Deepfake engine 121 (alone or in conjunction with UD Deepfake engines 307), for example, by fast forwarding, slowing down, skipping frames, or otherwise adjusting the DFC segments and/or the DFSCs. Such adjustments be synchronized by the server sync engine 118 (alone or in conjunction with UD sync engines 304) for presentation of DFC segments and associated DFSCs to DFUD users during a DFWP. A DFC segment may be provided to a given DFUD 104 by a content source 107 and/or by the server conference engine 119 (alone and/or in conjunction with UD conference engines 306) at any time. The server Deepfake engine 121 and server sync engine 118 (alone or in conjunction with UD Deepfake engine 307 and UD sync engines 304) may synchronize presentations of the DFC segments with DFSCs based upon an ordinary time or a determined variation therefrom—such variation may be then determined, random, variable, pre-determined or otherwise.

A DFR may be captured by a CCD associated with a DFPUD and provided by the DFPUD to the sync server 102. The DFSC derived from the DFR may also be provided to other DFUDs 104. The other DFUDs 104 may or may not receive a corresponding DFR.

For at least one implementation of a DFWP, Karaoke content and corresponding KACs may be specifically configured for use during a DFWP. For example, the Karaoke content may include a backing track and one or more scrolling or otherwise appearing lyrics (KACs), which are presented together to a DFPUD user in a given Karaoke content. For such an implementation, the server Karaoke engine 120 may not be needed, and user's vocal inputs may be captured as DFRs and communicated by the DFPUD to the server Deepfake engine 121 for processing as a DFR.

For another implementation of a DFWP, the DFC may be any content segment with respect to which information sufficient for generating of a DFT is available. That is the DFC may take any form.

For an implementation of a DFWP where multiple DFPUDs exist, a given DFPUD may, at a given time, have a CTI-P and a CTI-DFR associated with it. One or more of such CTIs may be common or different across one or more of the DFPUDs. Such CTIs may further vary over time and with respect to different DFC segments, DFTs, DFSs, DFRs and/or DFSCs. For example, if the providing of a given DFR to a given DFPUD is delayed, at a given time, than a corresponding DFSC will potentially also be delayed. Accordingly, it is to be appreciated that tremendous variability may arise in CTIs associated with various DFPUDs at any given time and during a DFWP with multiple DFPUDs.

For at least one implementation, the server Deepfake engine 121 coordinates DFWP content presentations across two or more DFUDs by using a priority scheme, wherein CTI-Ps, CTI-KACs, and CTI-DFRs for a designated host DFPUD are used to determine when DFSCs provided by other non-host DFPUDs are to be presented across two or more DFUDs participating in the given DFWP.

For another implementation, the server Deepfake engine 121 (alone and/or in conjunction with other server DFUD engines (as described herein) coordinates DFWP content presentations across two or more DFUDs by using a common CTI scheme, wherein averages of CTI-Ps and CTI-DFRs for a first DFPUD and one or more second DFPUDs are used to determine when first DFSCs associated with the first DFPUD and second DFSCs associated with the second DFPUDs are to be presented at the two or more DFUDs participating in the given DFWP.

For another implementation, the server Deepfake engine 121 coordinates DFWP content presentations across two or more DFUDs by using artificial intelligence and machine learning techniques which, based upon iterative representations of DFC segments and multiple DFSCs facilitate a presentation of DFSC segments and multiple DFSCs in a best-case or other selected synchronization format.

For example, using artificial intelligence and machine learning techniques, the server Deepfake engine 121 may determine over multiple iterations of DFSCs and with respect to a given DFC segment, that the sync server 102 receives first DFRs, from a given first DFPUD, one-tenth ($\frac{1}{10}^{th}$) of a second later than second DFRs are received by the sync server, while third DFRs are received one-tenth ($\frac{1}{10}^{th}$) of a second earlier than the second DFRs. Under such an example, the server Deepfake engine 121 may be configured to not delay presentations of the first DFSCs, delay the second DFSCs by one-tenth ($\frac{1}{10}^{th}$) of a second, and delay the third DFSCs by two-tenth's ($\frac{2}{10}$ths) of a second (while further accounting for any DFR to DFSC processing delays).

For another implementation, where DFRs for a given "hopelessly out of synch" DFPUD are commonly out of synch with other DFRs for other DFPUDs, the server Deepfake engine 121 (alone or in conjunction with one or more of the UD Deepfake engine 307) may be configured to present such "hopelessly out of synch" DFSCs on a selection of participating DFUDs. For example, the "hopelessly out of synch" DFSCs may be presented on the DFPUD generating the "hopelessly out of sync" DFRs, while not being presented or used in determining synchronizations of DFRs (and corresponding DFSCs) from other DFPUDs.

It is to be appreciated that other synchronization schemes may be used by the server Deepfake engine 121 (alone or in conjunction with the UD Deepfake engine 307) to facilitate substantially simultaneous presentations of DFC segment and multiple DFSCs on multiple DFUDs during a DFWP. The server Deepfake engine 121 (alone or in conjunction with the UD Deepfake engines 307) determine which of one or more of a CTI-P and a CTI-DFR associated with the multiple DFPUDs to utilize at any given time for a given DFWP.

The server Deepfake engine 121 (alone or in conjunction with UD Deepfake engine 307) may be configured to receive DFWP timing information from a host DFPUD on a different periodicity than DFWP timing information is received from one or more non-host DFPUDs and/or from one or more DFUDs. The server Deepfake engine 121 (alone or in conjunction with UD Deepfake engine 307) may be configured to receive DFWP timing information from any given DFUD 104 participating in a given DFWP on any basis, periodicity, or otherwise. Such DFWP timing information may be provided by UD Deepfake engine 307, approximated by the server Deepfake engine 121 based upon other CTIs, or otherwise.

The server Deepfake engine 121 (alone or in conjunction with UD Deepfake engine 307), may be configured such that DFWP segments (DFC segments and DFSCs), are communicated to the two or more DFUDs 104 on a real-time or other basis. For example, delays arising with the communication, processing, and/or presenting of given DFC segments, by a given DFUD 104 may be addressed (if addressable) such that the presentation of one or more future arising DFC segments continues to occur substantially simultaneously on other DFUDs and with respect to a presentation thereof on a given DFPUD. The server Deepfake engine 121 (alone or in conjunction with UD Deepfake engine 307), may be configured to facilitate synchronization of DFWP segments such that presentation thereof occurs substantially simultaneously on a DFPUD and at least one DFUD.

The server Deepfake engine 121 (alone or in conjunction with UD Deepfake engine 307), may be configured to adjust presentations of Karaoke content segments by one or more DFUDs in view of CTIs provided by a host DFUD, which may be a DFPUD or a DFUD. Such adjustments may occur so that the presentation of a DFC segments by the host DFUD is at one or more of a quality setting, a minimum quality setting, a maximum quality setting, or otherwise.

The server Deepfake engine 121 (alone or in conjunction with UD Deepfake engine 307), may be configured to use sync data 204B including, but not limited to, CTIs provided by one or more DFUDs 104. Sync data 204B may also include computer instructions used to facilitate synchronization of DFC segments with DFSCs during a DFWP. Non-limiting examples of sync data 204B may include communications sockets used by DFUDs to connect with a content provider 105 and/or a content node 106, IP addresses for DFUDs, DFUD identifiers, such as MAC addresses, communications network settings used for one or more of the content links 114, sync links 110, and otherwise. The server Deepfake engine 121 (alone or in conjunction with UD Deepfake engine 307), may be configured to use user data 204A to a facilitate synchronization of DFC segments with DFSCs during a DFWP. Non-limiting examples of user data 204A include user demographic information, DFUD information such as capabilities, technologies supported, and the like by a given DFUD, user preferences, user viewing histories, and the like.

A sync link 110 used at a given time during a DFWP may physically and/or virtually change for any reason, such as when a physical or virtual location of a given DFUD changes and/or one or more properties of a CCD link 136 changes. For example, a DFUD may connect to a first sync server 102 from a home location using a high-speed Internet connection. During a second DFWP, such DFUD may connect to the sync server 102 using a 4G cellular connection. Similarly, a CCD 134 may change location as a user moves throughout a house or otherwise. Such changes in location, connections, network properties, or otherwise may result in a decrease or increase of one or more characteristics of a CCD link 136, such as bandwidth used, latency, signal interference, or otherwise. Such change may impact CTIs. Accordingly, it is to be appreciated that the server Deepfake engine 121 (alone or in conjunction with the UD Deepfake engine 307) may determine which sync data 204B to use at any given time during a DFWP and the frequency of which such determining is occur. For example, a DFWP with a mobile DFPUD may use more frequent determinations of which sync data 204B to use than may occur with a stationary DFPUD. Sync data 204B determinations may vary based upon one or more characteristic of communications links used by a given DFUD 104 to connect to with the sync server 102. Sync data 204B may be used by the sync server 102 in initially configuring the sync link 110 between the sync server 102 and a given DFUD and in reconfiguring, such as by adjusting a bitrate utilized, the sync link 110 used, or other connection parameters during the DFWP to facilitate substantially simultaneous presentation of DFC segments and DFSCs by multiple DFUDs during a DFWP.

Other synchronization approaches may be used for other implementations of the present disclosure.

Server Data Store 204

The server data store 204 may be a storage, multiple storages, or otherwise. The server data store 204 may be configured to store user data 204A, sync data 204B, conference data 204C, watch party content data 204D, Deepfake models data 204E, and other data. The server data store 204 may be provided locally with the sync server 102 or remotely, such as by a data storage service provided on the Cloud, and/or otherwise. Storage of data, including but not limited to user data 204A, sync data 204B, conference data 204C, watch party content data 204D, Deepfake models data 204E, and other data may be managed by a storage controller (not shown) or similar component. It is to be appreciated such storage controller manages the storing of data and may be instantiated in one or more of the server store 204, the server CPU 202, on the Cloud, or otherwise. Any known or later arising storage technologies may be utilized in conjunction with an implementation of the present disclosure to facilitate the server data store 204.

Any known or later arising storage technologies may be utilized for the server data store 204. Non-limiting examples of devices that may be configured for use as server data store 204 include electrical storages, such as EEPROMs, random access memory (RAM), Flash drives, and solid-state drives, optical drives such as DVDs and CDs, magnetic storages, such as hard drive discs, magnetic drives, magnetic tapes, memory cards, such as Compact Flash (CF), Secure Digital (SD) cards, Universal Serial Bus (USB) cards, and others.

Available storage provided by the server data store 204 may be partitioned or otherwise designated by the storage controller as providing for permanent storage and temporary storage. Non-transient data, computer instructions, or other the like may be suitably stored in the server data store 204. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient computer instructions, and other data.

Watch party content data 204D may include segments of watch party content that corresponds to a given primary content. One or more watch party content segments may be stored on the sync server 102, one or more UDs 104, and/or the Cloud. For at least one implementation, a content link 114 may be used to provide watch party content data to the sync server 102 from a content node 106.

Deepfake models data 204E may include models of one or more users providing one or more DFRs during a DFWP. Such Deepfake models may be generated using any known or later arising Deepfake modeling programs including those identified herein above and otherwise and stored in any compatible format for use during DFWP.

A sync server 102 may include information identifying segments of content that are stored on one more UDs 104. Such content segments are referred to herein as "pre-cached content." Non-limiting examples of pre-cached content may include commercials, segments of non-live programs, or otherwise. Pre-cached content may be used by a sync server 102 to facilitate a Party providing ready access to the content, by a given UD 104, when a given content link 114 is unreliable, of insufficient bandwidth, experiences undesirable latency, or otherwise. A sync server 102 may instruct a given UD 104 to access such pre-cached content on an on-demand or otherwise basis. Such instructions may be provided, for at least one implementation, over one or more of the sync link 110 and/or the content link 114.

Server Power Supply 206

The sync server 102 may include a server power supply 206. The server power supply 206 may include any known or later arising technologies which facilitate the use of electrical energy by a sync server 102. Non-limiting examples of such technologies include batteries, power converters, inductive charging components, line-power components, solar power components, and otherwise.

Server Security 208

The sync server 102 may include a server security 208. The server security 208 may include any known or later arising security hardware components and/or computer instructions configured for use to secure content, communications regarding such content, server processes and data, and otherwise. Security components may be used to facilitate secure transmission, processing, storage and otherwise of any data used in accordance with an implementation of the present disclosure.

Server Communications Interface 210

The sync server 102 may include a server communications interface 210. The server communications interface 210 may be configured to use any known or later arising communications and/or networking technologies which facilitate use of the communications network 109 (as further described below). Communication interfaces are well-known in the art and non-limiting examples include Ethernet cards, USB and storage medium interface cards, radio frequency transceivers, and others.

Server User interface 212

The sync server 102 may include a server user interface 212. The server user interface 212 may include any known or later arising human to device interface components, processes, and technologies. Non-limiting examples of interface components include devices configured for use with audible inputs (such as spoken commands) and audible outputs (generated sound), visible inputs (such as CCD captured data) and visible outputs (such as data provided for presentation on a display device), and otherwise. The server user interface 212 may be coupled to and/or include the one or more presentation devices (not shown). The presentation devices facilitate interactions between an operator and the sync server 102.

Content Providers 105, Content Nodes 106 and Content Sources 107

For at least one implementation, the system 100 may include one or more content nodes 106. Content nodes 106 may be provided individually and/or collectively with a content provider 105 and/or one or more content sources 107. Non-limiting examples of content providers 105 include SLING TV, NETFLIX, AMAZON PRIME, and others. Content providers 105 commonly receive primary content 108 from content sources 107. Non-limiting examples of content sources 107 include television networks, such as ABC, NBC and the like, pay-per-view transmission, online channels, and otherwise. A content provider 105 and a content source 107 may be provided in combination or separately. Content sources 107 may be communicatively coupled to one or more content providers 105 which provide content to UDs 104 via one or more content nodes 106. One or more of the content providers 105, content nodes 106 and/or content sources 107 may be similarly configured to the sync server 102 and include one or more processors, data storage components, user interface components, security components, communications, and other components. The characteristics and capabilities of such components are well known in the art and one or more of such components may be configured to execute computer instructions which facilitate cell phone watch parties. A content provider 105 and/or one or more content nodes 106 may include use of a content distribution network.

Network 109

A network 109 communicatively couples the various system 100 elements. The network 109 may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise. One or more communications and networking standards and/or protocols may be used including, without limitation, the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, and others.

The network 109 may include physical data processing and communication components. The network 109 may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized.

As shown in FIG. 1, one or more communications links may be established between one or more of a sync server 102, a UD 104, and a content node 106. A number of such communications links, including the communications links, may be combined or provided as multiple, or other combinations of communication links. Accordingly, it is to be appreciated that the communications links are described herein for purposes of functional explanation and are not limited to any particular physical, virtual, or other configurations.

More specifically, a sync link 110 may be established between a sync server 102 and a UD 104. The sync link 110 may be used to facilitate communication of timing, status, and other synchronization information by and between a given UD 104 and the sync server 102.

As further shown in FIG. 1, a conference link 112 may be established between a sync server 102 and a UD 104. The conference link 112 facilitates bi-directional communication of one or more users' reactions to a given content during a Party and reactions captured by a given UD may be shared during a Party. Reactions, including cell phone reactions, may be communicated to the sync server 102 using the conference link 112 and redistributed to the other users using respective other conference links 112 established therebetween. For example, audio and/or video of a user's reaction may be communicated over respective conference links 112 to other users while content information is communicated over respective content links 114 such that, as combined, information may be presented using an output device in a picture-in-picture, overlay, separate audio channel, mixed audio channel, text message stream, closed captioning stream, or otherwise to users showing primary content and watch party content. Reactions may be communicated using the system 100 in separate data streams, such as separate MPEG, AAC, or other audio and/or video streams. A UD 104 and/or the sync server 102 may be configured to mix, present, or otherwise process reactions in accordance with preferences of a given user, based upon a default setting, or otherwise.

As further shown FIG. 1, a content link 114 may be established between a sync server 102 and a UD 104. A content link 114 facilitates communication of content by a content node 106 to a UD 104. While depicted in FIG. 1 as a unidirectional link, it is to be appreciated that a content link 114 may be bi-directional, or otherwise.

The sync links 110, conference links 112 and content links 114 may utilize any known or later arising communications technologies, with non-limiting examples including communication links provided by wired connections, wireless connections including micro-wave, 3G/4G/5G, WIFI, BLUETOOTH, and other types, satellite connections, fiber optic connections, and otherwise.

One or more of the sync server 102, a transmitting UD 104 and/or a receiving UD 104 may be configured to transform reactions provided by a given user into an audible, visual, grammatical, phonetic, language, or other format selected by another user. For example, reactions in the Spanish language may be translated into the English language. Similarly, reactions may be converted to text for hearing impaired users and physical reactions (such as clapping or the like) may be converted to descriptive text for visually impaired users. Other reactions may be converted for any given implementation. For at least one implementation, Cloud based resources may be used for reaction conversions.

UDs 104

As shown in FIG. 3, a schematic illustration of a UD 104 for facilitating Parties, in accordance with at least one implementation of the present disclosure, may include a CPU 302, a data store 310, a power supply 332, a security 334, a communications interface 336, and a UD user interface 324. The user interface may further include a view engine 326, and a multiplexer ("mux") 328. A UD 104 may include an internal display 330 and may be coupled to an external display 130 (as shown in FIG. 1).

As discussed above, the system 100 includes two or more UDs 104 including a HUD 104-H and one or more CUDs 104-C. The UDs 104 may be similarly configured or may be differently configured, for a given implementation. Known and/or later arising device capable of receiving and presenting content to a user while facilitating collaboration during a Party may be used. Non-limiting examples of UDs 104 include smartphones, laptop computers, tablet computing devices, desktop computers, smart televisions, smart glasses, virtual reality glasses, augmented reality glasses, earbuds/headphones and other audible output devices, and other devices. UDs 104 may be communicatively coupled to one or more of the content providers 105, content nodes 106, content sources 107, and/or sync servers 102 using any known or later arising communications and/or networking technologies including, but not limited to, cable systems, satellite systems, streaming audio and video systems, online gaming systems, and/or other content distribution systems, on-line content distribution systems, combinations thereof, and the like.

UD CPU 302

As shown in FIG. 3, a UD 104 may be configured to include a UD CPU 302. The UD CPU 302 may be configured similarly to and/or have less, the same, or more of the capabilities of the server CPU 202, as described above. For purposes of conciseness, such capabilities are not repeated here. Any know or later arising data processing and other CPU technologies may be used as the UD CPU 302. The UD CPU 302 may be communicatively coupled, by a UD data bus 327 or similar structure, to other components of the UD 104 including, but not limited to, a UD data store 310, which may also be referred to as a "computer readable storage medium."

Primary Content Engine 308

The UD may also be configured to include one or more "engines" (as defined above) including a primary content engine 308. The primary content engine 308 may be configured to support the features and functions of the server sync engine 118 and the server conference engine 119 in facilitating the synchronization of primary content and of collaboration across UDs 104 participating in a Party.

A primary content engine 308 may be configured to facilitate such substantially simultaneous presentation of a given primary content segment by adaptively modifying one or more of the resolution, bit rate, content size, communications bandwidth utilized, communications link type used between a content node 106 and a given UD 104, or otherwise. The primary content engine 308 may be configured to retrieve and synchronize presentation of primary content on a given UD 104 in order to facilitate a Party. A primary content engine 308 may communicate status information over a content link 114 to a content node 106.

For at least one implementation, ABR streaming sessions may be used between a given content node 106 and a given UD 104 to facilitate substantially simultaneous presentation of primary content during a Party. One or more adaptive bitrate streaming technologies may be utilized by a content node 106 and a communicatively coupled thereto primary content engine 308 executing on a given UD 104. Non-limiting examples of ABR streaming technologies that may be utilized include MPEG-DASH, Adobe Systems HTTP Dynamic Streaming, Apple HTTP Live Streaming, Microsoft Smooth Streaming, and others. It is to be appreciated that by adaptively modifying the bitrate used to provide primary content to a given UD 104 and to multiple UDs 104 during a Party, content segments may be respectively and substantially simultaneously communicated, received, decoded, and presented on the UDs 104 participating in a Party.

For example, for a host UD 104-H communicatively coupled to a host content node 106-H using a 100 Mb/s connection, the host content node 106-H and/or a first host content link 114-H may be configured to provide a given content segment at a 4K resolution. For a CUD 104-C communicatively coupled to a client content node 106-C using a 15 Mb/s connection, the client content node 106-C and/or the client content link 114-C may be configured to provide the given content segment at a 720p resolution to the CUD 104-C. By providing the given content segment at the lower resolution it is to be appreciated that the reception and presentation of such content segment may occur substantially simultaneously (assuming UD content processing times are equal) on the HUD 104-H and the CUD 104-C.

Further, given that processing times for UDs 104 for given content segments may vary, a primary content engine 308 may be used in conjunction with a UD sync engine 304 to determine one or more transmission and/or processing characteristics (herein "transmission characteristics"), such as bandwidth, latency, resolution, processing speed, packet size, and others. Transmission characteristics may vary over time, by UD 104, and otherwise. Transmission characteristics may be suitably stored as content data 318 and in a UD data store 310. User data 218A may also be accessed by the primary content engine 308 in determining one or more characteristics of content information to be received from a given content source for a given UD.

Party Content Engine 309

For at least one implementation, a Party content engine 309 may be configured to facilitate such substantially simultaneous presentation of a given watch party content segment by adaptively modifying one or more of the resolution, bit rate, content size, communications bandwidth utilized, communications link type used between a CCD 134, a given UD 104, and a sync server 102.

A Party content engine 309 may be configured to retrieve and synchronize presentation of content on a given UD 104 in order to facilitate a Party. A Party content engine 309 may be configured to communicate status information for content over the sync link 110-H to the sync server 102. Based on such status information, the sync server 102 may coordinate the providing of content to other UDs 104 participating in a given Party.

Further, given that processing times may vary for UDs 104 and for a given content segment, a Party content engine 309 may be used in conjunction with a UD sync engine 304 and other engines to determine one or more characteristics of a given CCD link 136, via which a given UD 104 receives user data 138 and/or background data 140 from a CCD 134, and one or more characteristics of a given sync link 110 and/or a given conference link 112, via which the given UD 104 communicates the as received and/or as processed user data 138 and/or background data 140 to the sync server 102. Non-limiting examples of such one or more characteristics include bandwidth, latency, resolution, file size, and the like. Such one or more characteristics may be suitably stored as CCD data 320 in a UD data store 310.

User data 312 may be accessed by a Party content engine 309 in determining one or more characteristics of reactions received from a CCD 134 and/or another UD. For example, user data 312 may assist in identifying a received user data 138-A as corresponding to the first user "A", while a second received user data 138-B may correspond to the second user "B", while a third received user data 138-C corresponds to the third user "C." Based on the user data 312, a Party content engine 309 may be configured to determine which user data 138, such as first user data 138-A or the like to output for display on an internal display 330 and/or an external display 130, how user data 138 is to be displayed, such as in terms of resolution, size, location, or otherwise.

CCD data 320 may also be accessed by a Party content engine 309 in establishing a CCD link 136 between a given UD 104 and one or more CCDs 134. For at least one implementation, the establishing of a CCD link 136 may occur using known or later arising device to device pairing protocols, such as those used for pairing BLUETOOTH, Z-WAVE, and other devices. For at least one implementation, a UD CPU 302 may be configured to instantiate multiple device pairing sessions, where a given device pairing session facilitates establishment of a CCD link 136 between a given UD 104 and a given CCD 134. By using multiple sessions, multiple CCDs 134 may be paired with a given UD 104. When multiple CCDs 134 are so paired to a given UD 104, such pairing occurring using e.g., BLUETOOTH and/or other device-to-device pairing technologies, the Party content engine 309 may be configured to identify which user data 138 captured by a given, so paired, CCD 134 to process, present, communicate to the sync server 102, store for later processing, or otherwise execute one or more operations with respect thereto, such as outputting such user data 312 for presentation on an internal display 330 and/or on an external display 130. The Party content engine 309 may cooperate with the view engine 326 and a multiplexer ("mux") 328 to provide user data 138 and/or background data 140 for presentation, at a given time, on a display device or to output such data using other output devices in a humanly perceptible format such as one or more sounds, motions, temperatures, vibrations, or otherwise.

For at least one implementation, the Party content engine 309 may utilize preference data 322 in determining what operations to perform with respect to one or more instances of user data 138 and/or background data 140 received, stored and/or otherwise available for presentation to a user of a given UD 104. For a non-limiting example, a Party content engine 309 may be configured to recognize a given background data identifies a user's home and based upon one or more preferences identified in the preference data 322 replace the background data received from a CCD 134 with different background data to be communicated to the sync server 102. Other data processing operations, such as filtering, replacing, obscuring, modifying, or otherwise with respect to user data 138 and/or background data 140 may be performed by a Party content engine 309 and in view of one or more preference data 322, CCD data 320, content data 318 or other data available to a given UD 104.

UD Sync Engine 304

For at least one implementation, a UD sync engine 304 may be configured to manage synchronization of content during a live and/or recorded Party and while such content is provided separately by one or more CCDs 134 to a UD 104. Status information regarding the communication of content from a CCD 134 to a UD 104 may be provided by the CCD 134.

A UD sync engine 304 may be configured to cooperate with the server sync engine 118, as discussed above, to facilitate KWPs and DFWPs. The UD sync engine 304 may facilitate synchronization of primary content during a Party by accepting a designation of a given UD 104 as a HUD 104-H, CUD 104-C, PUD, KUD, KPUD, DFUD, and/or a DFUD—one or more of such designations may occur at any given time. A UD sync engine 304 may be configured to limit a UD's 104 capabilities and functions to being one or the other of a host or a client during a Party. For example, a given UD 104 associated with a parent of a household may be configured to function as a HUD or a CUD, while a given UD associated with a child in that household may be configured to function solely as a CUD.

A UD sync engine 304 may be configured such that upon initiating a Party that UD is automatically, manually, or otherwise designated as a HUD 104-H and/or a PUD, KPUD and/or DFPUD for the given Party. A UD sync engine 304 may be configured such that a given UD 104 participating in a given Party may be designated as the HUD (or otherwise) at any time during the Party. Such designation(s) may occur, for example, when the UD 104 seeks to seize control of the Party for any or no reason. For example, a parent may seek to seize control of a Party and become the host thereof when collaboration occurring during the Party includes inappropriate content.

A UD sync engine 304 for a HUD 104-H may be configured to designate another UD, such as a CUD 104-C, as the HUD, such as when a prior host is no longer participating in a given KWP, or as otherwise needed.

Commonly, one UD 104 is designated as the HUD at any given time during a Party, with other UDs being designated as CUDs. A UD sync engine 304 in a participating UD 104 may be configured to reflect the then occurring status of a given UD 104.

A UD sync engine 304 may be configured to synchronize a presentation of content, on one or more UDs 104 by providing CTIs to the server sync engine 118. CTIs may be provided to the server sync engine 118 by a UD sync engine 304 executing on the designated UD 104. CTIs may be provided to the server sync engine 118 and CUDs 104-C by the UD sync engine 304 executing on a designated HUD 104-H. CTIs may be provided to the server sync engine 118 by corresponding UD sync engines 304 executing on the HUDs 104-H and CUDs 104-C. Content timing information may be provided by a given UD 104 to the sync server 102 and/or any other UD 104 participating in a given Party on any basis, periodicity, or otherwise.

For at least one implementation, a sync engine 304 may be configured to periodically receive content timing information for the HUD 104-H from the sync server 102.

For at least one implementation, a UD sync engine 304 may be configured to facilitate use of one or more trick-play modes during a Party. Trick-play modes, when supported for a given content, may be requested, via the UD sync engine 304, by a CUD 104-C for approval of and selected by the HUD 104-H. A trick-play mode selected by the HUD 104-H may be communicated by a UD sync engine 304 executing thereon and to the server sync engine 118, and further communicated to a UD sync engine 304 executing on a CUD 104-C participating in the given Party. For at least one implementation, trick play modes may include configuring a Party for use as a KWP and/or a DFWP.

A communication of a selected trick-play mode by a HUD 104-H to the server sync engine 118 and thereon to a CUD 104-C may include CTIs specifying a start location for the selected trick-play mode, an identification of the type of trick-play mode selected, and (where appropriate) an end UTC location specifying where normal play mode is to resume, and/or other information useful in facilitating implementation of the selected trick-play mode by the CUD 104-C participating in the given Party.

The UD sync engine 304 may be configured to capture the information needed to facilitate trick-play modes across one or more CUDs 104-C participating in a given Party. A trick play mode may be applied, in synchronization, with any content which has been presented to a UD 104 at substantially the same time, as designated, for example, by a UTC location.

A UD sync engine 304 on a CUD 104-C may be configured to modify trick-play instructions, as received from a HUD 104-H and via the sync server 102. Such modified trick-play instructions may be specific to the given CUD 104-C. It is to be appreciated that modifications of trick-play instructions, may be in view of and/or based upon client CTIs generated by the given CUD 104-C. Such client CTIs may be indicative of synchronization issues a given CUD has been experiencing during a given Party, such as repeatedly receiving a given content at a faster or slower rate than occurs with respect to the HUD 104-H and adjustments made by the UD sync engine 304 independently or based upon adjustment instructions received from the server sync engine 118.

A given sync engine 304 may be configured such that a given content segment, as communicated to the given CUD 104-C, occurs such that any latency, delays, and/or other issues arising with the communication, processing, and/or presenting of a given portion of a content segment by the given CUD 104-C are addressed (if addressable) such that the presentation of future arising content segments by that CUD 104-C occurs substantially simultaneously with the presentation of content segments by the HUD 104-H. The server sync engine 118 may be configured to facilitate synchronization of content segments by a UD sync engine 304 such that presentation of future content occurs substantially simultaneously across two or more UDs participating in a given Party.

A UD sync engine 304 may be configured such that adjustments to presentations of content by a CUD 104-C, in view of CTIs provided by the HUD 104-H, occurs such that the presentation of such content by the CUD 104-C is at one or more of a quality setting, a minimum quality setting, a maximum quality setting, or otherwise.

When a specified quality setting is not achievable, at a given time and/or over a given period, by a given CUD 104-C, the UD sync engine 304 for such CUD 104-C may take corrective actions until such quality settings can be realized thereby. Non-limiting examples of such corrective actions include: pausing, fast forwarding, slowing down, or otherwise modifying how content is provided to and/or presented by a given CUD 104-C during a Party.

A UD sync engine 304 may be configured to utilize sync data 314 including, but not limited to, CTIs including, but not limited to, fast-play, slow-play and other sync options, provided by one or more UDs 104. Sync data 314 may include a subset of, additional, different, or the same data and/or computer instructions used to facilitate synchronization of content presentation during a Party. Non-limiting examples of sync data 314 include communications sockets used by UDs 104 to connect with a content provider 105 and/or a content node 106, IP addresses for UDs 104, UD identifiers, such as MAC addresses, communications network settings used for one or more of the content links 114 or sync links 110, available buffer and/or storage on a UD 104, and otherwise.

A UD sync engine 304 may utilize user data 312 to a facilitate synchronization of watch party content during a Party. User data 312 may include a subset of, additional, different, or the same data and/or computer instructions used to facilitate synchronization of primary content presentation during a watch party and/or during a Party as provided in the user data 204A. Non-limiting examples of user data 312 include user demographic information, UD information such as capabilities, technologies supported, and the like, user preferences, user viewing histories, and the like.

Karaoke Engine 305

A Karaoke engine 305 may be configured to perform and/or facilitate the performing by the sync server 102, the server Karaoke engine 120, and/or other KUD Karaoke engines of one or more KWP Operations, as described above with respect to FIG. 5. Such Operations are not repeated herein, any of such Operations may be performed by a Karaoke engine 305 alone and/or in conjunction with the sync server 102 and/or other KUDs.

Conference Engine 306

A conference engine 306 may be configured to facilitate collaboration by and between users, via their respective UDs 104, during a Party, and using the two or more conference links 112 established with the sync server 102.

Synchronization of and collaboration by and between users (via their respective UDs 104) during a given Party may be decoupled from one or more of a providing of content (by the content nodes 106 to the UDs 104) and/or any synchronization of content presentation, as facilitated by the UD conference engine 306 in cooperation with the server conference engine 119. A UD conference engine 306 may be configured to provide of reactions of a given user with the sync server 102 independently of other KWP elements.

A UD conference engine 306 may be configured to support collaboration between users in any humanly perceptible format; non-limiting examples including speech, video, text, emoticons, gestures, or otherwise. The conference links 112 and collaborative aspects of a Party may be established or unestablished at any time. A UD conference engine 306 may be configured to leverage proprietary, custom, open source, or otherwise provided conferencing software applications including, but not limited to, JITSI MEET, WEBEX, ZOOM, and otherwise.

A UD conference engine 306 may be configured to utilize conference data 316. Conference data 316 may a subset of, additional, different, or the same data and/or computer instructions used to facilitate synchronization of content presentation during a Party as provided by conference data 204C. Conference data 316 may include any data and/or computer instructions which facilitate collaboration during a Party. Non-limiting examples of Conference data 316 include communications sockets used by UDs, IP addresses for UDs, UD identifiers, such as MAC addresses, communications network settings used for one or more conference links 112 and otherwise. A UD conference engine 306 may be configured to utilize user data 312 to a facilitate collaboration during a Party.

Conference data 316 may be stored in the UD data store 310 and used by the UD conference engine 306 in facilitating collaboration during a Party. Non-limiting examples of conference data 316 include type of connection, distance of a UD 104 from a sync server 102, maximum available bandwidth for a given conference link 112, throughput for the conference link 112, latency, and other data. UD conference data 316 may be provided for one or more conference links 112 used during a Party.

A UD conference engine 306 may be configured to facilitate any singular or combination of voice, video, web, or other conferencing activities including, but not limited to, chat, private rooms, polling, voting, verbal reactions, visible reactions, emoticons, or the like. A UD conference engine 306 may facilitate user-to-user (or private) communications, user-to-multiple user (or semi-private) communications, user-to-all (or public) communications, or otherwise during a Party.

A UD conference engine 306 may be configured to store user communications during a given Party in the UD data store 310 as UD conference data 316. UD conference data 316 may be time stamped and/or otherwise synchronized with respect to a given content segment such that a later playback of the conference data and/or the given content segment may include the conference data corresponding to such given content segment, as such conference data was generated during the given Party. For example, a later viewing of the football program—the primary content—and KWP by a user of the given UD 104 may include a presentation of the UD conference data 316 arising during the original KWP. Synchronization and presentation information provided by UD conference data 316 may enable the user of the given client UD to later enjoy the original KWP as if participating real-time even when such KWP may in fact have occurred earlier. Such example may also be extended to other forms of Parties including, but not limited to, DFWPs.

UD Deepfake Engine 307

A UD Deepfake engine 307 may be configured to perform and/or facilitate the performing by the sync server 102, the server Deepfake engine 121, and/or other DFUD, and DFPUD Deepfake engines of one or more DFWP Operations, as described above with respect to FIGS. 4-6. Such Operations are not repeated herein by such Operations may be performed by a UD Deepfake engine 307 alone and/or in conjunction with the sync server 102 and/or other DFUDs.

UD Power Supply 332

A UD 104 may include a UD power supply 332. The UD power supply 332 may include any known or later arising technologies which facilitate the use of electrical energy by a UD 104. Non-limiting examples of such technologies include batteries, power converters, inductive charging components, line-power components, solar power components, and otherwise.

UD Security Module 222

A UD 104 may include a UD security 334. The UD security 334 may include any known or later arising security hardware components and/or computer instructions configured for use to secure content, communications regarding such content, UD processes and data, and otherwise. Security components may be used to facilitate secure transmission, processing, storage and otherwise of any data used in accordance the present disclosure.

UD Communications Interface 336

A UD 104 may include one or more UD communications interface 336. A UD communications interface 336 may be configured to use any known or later arising communications and/or networking technologies which facilitate use of the communications network 109 (as described herein).

UD User Interface 324

A UD 104 may include a UD user interface 324. The UD user interface 324 may include any known or later arising human to device interface components, processes, and technologies. Non-limiting examples of input/output uses include audible inputs (such as spoken commands) and outputs (generated sound), visible inputs (such as eye tracking and facial recognition) and outputs (such as visible images presented on a display device, LEDs, or otherwise), touch inputs touch feedback (such as vibrations or other movements), gesture tracking, and otherwise. The UD user interface 324 may be coupled to and/or include the one or more presentation devices such as an internal display 330 and/or an external display 130. The UD user interface 324 may facilitate receiving and processing, in whole or in part, of reactions, including KRs and DFRs, as captured by a CCD 134.

A UD user interface 324 may be configured to include one or more view engines 326. A view engine 326 is an "engine" (as defined above) which facilitates presentation of content from a given view or perspective. A view engine 326 may facilitate presentation of collaboration information as received by the given UD from the sync server 102. Collaboration information presented by a view engine 326 for a first UD, such as a HUD 104-H, may be the same or different than collaboration information presented by a view engine 326 for a given CUD 104-C.

A UD user interface 324 may include a multiplexer ("mux") 328. A mux 328 may be provided as an "engine" (as defined above). A mux 328 may combine collaboration data received from the sync server 102 with content data received from a CCD 134 and with primary content received from a content node 106. A combined presentation may be output by the mux 328 as an integrated presentation of the primary content, watch party content and other collaboration data (when available). During KWPs and DFWPs, the mux 328 and/or view engine 326 may be configured to facilitate one or more of the operations described above with respect to FIGS. 4-6 including, but not limited to, the presentation of Karaoke content, KFPCs, KSCs, Deepfake content, DFPCs, and DFSCs.

A mux 328 may be configured to modify or adapt an integrated presentation of content based upon one or more characteristic of a given Party. For example, a mux 328 may be configured to mute and/or decrease the volume of primary content audio and/or dim a brightness of a primary content video when the watch party content includes spoken audio by a user of a CUD 104-C. A mux 328 may be configured to receive an input signal from a user input device, such as a keyboard, button, detected gesture, or the like indicative that a user of the given UD desires to provide watch party content to other users during a Party. In response to such input, the mux 328 may be configured to mute primary content audio or dim a primary content video while the user provides the secondary content.

Similarly, other properties of a given primary content, such as video content properties, may be adjusted by the mux 328 when a cell phone is being provided by a user and such watch party content may conflict with or otherwise be given priority and/or precedence over the then arising primary content. For example, primary content video information may be dimmed, diminished in brightness, diminished in sizing, resolution, or otherwise when watch party content is provided. Such video collaboration information may be identified as having a higher priority than the content information by a user of a UD configured to provides such prioritization to the watch party content, such as, but not limited to, a host UD 104-H. For example, a Party that includes an unexpected marriage proposal may be configured to provide priority or other emphasis to other content captured by a CCD 134 during the wedding proposal over the otherwise arising primary content.

Internal Display 330

A UD user interface 324 may be coupled to an internal display 330. The internal display 330 may include any singular or combination of visual display devices configured to provide in whole or in part, one or more content segments. Non-limiting examples of internal displays 330 includes display screens or panels, speakers, vibrational elements, lights, and the like. A UD user interface 324 may be configured to provide first content on the internal display 330 while providing second content on an external display 130, or vice-versa.

External Display 130

A UD 104 may be communicatively coupled to an external display 130. Such coupling may occur directly, indirectly such as via use of a 10-Foot device, or otherwise. Multiple external displays 130 may be used in conjunction with a UD 104. For a non-limiting example, first content may be presented on a first external display 130, while second content is presented on a second external display 130. A UD sync engine 304 may present first content segments received from a content node 106 such that the other content segments received from a CCD 134 may be synchronized therewith.

For at least one implementation, content may be presented in a first content window 142, while second content, such as user image data 146 and/or background image data 148 is presented in a second content window 144. Multiple forms of content may be presented as an overlay, in separate windows, multi-picture, picture-in-picture, or otherwise.

A UD user interface 324 may be configured to receive and/or output content segments that include one or more types of data including audio content, visual content, and others. Such inputs and outputs may occur using known and/or later arising interfaces therewith, herein "I/O interfaces." Various non-limiting features and functions of such I/O interface are described herein.

Audio I/O Interface

An audio I/O interface may support a receiving and/or presenting of audible content to a user via a UD 104. Such audible content (which is also referred to herein as being "audible signals") may include spoken text, sounds, or any other audible information. Such audible signals may include one or more of humanly perceptible audio signals, where humanly perceptible audio signals typically arise between 20 Hz and 20 KHz. The range of humanly perceptible audio signals may be configurable to support an audible range of a given individual user.

An audio I/O interface generally includes hardware and computer instructions (herein, "audio technologies") which supports the input and output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise.

An audio I/O interface may use one or more microphones and speakers to capture and present audible signals respectively from and to a user. Such one or more microphones and speakers may be provided by a given UD 104 itself or by a device communicatively couple additional audible device component. For example, earbuds may be communicatively coupled to a smartphone, with the earbuds functioning as an audio I/O interface and capturing and presenting audio signals as sound waves to and from a user, while the smartphone functions as a UD.

An audio I/O interface may be configured to automatically recognize and capture comments spoken by a user and intended as audible signals for sharing with other users during a Party. Such identification may occur as a default setting of the audio I/O interface into a "capture" mode, based upon analysis and recognition of spoken comments as being intended for one or more second users attending a Party.

For example, a comment such as, "Go CHIEFS," where "CHIEFS" refers to an NFL football team participating in a game being presented during a Party, may be automatically captured, and shared as one or more audible signals by an audio I/O interface with other users during the Party. The analysis and determination of which captured sounds to share with select users during a Party may be accomplished by execution of corresponding computer instructions by one or more of the engines described herein including, but not limited to, the UD conference engine 306, and other components such as the UD user interface 324, and/or in conjunction with computer instructions executed by a sync server 102 and engines instantiated thereby.

Visual I/O Interface:

A UD 104 may include a visual I/O interface configured to support the receiving and presenting of visual content (which is also referred to herein as being "visible signals") between UDs during a Party. Such visible signals may be in any form, such as still images, motion images, augmented reality images, virtual reality images, and otherwise.

A visual I/O interface generally includes hardware and computer instructions (herein, "visible technologies") which supports the input by and output of visible signals to other UDs during a Party. Such visible technologies may include technologies for converting images (in any spectrum range) into humanly perceptible images, converting content of visible images into a given user's perceptible content, such as by character recognition, translation, playback rate adjustment, playback frequency adjustment, and otherwise.

A visual I/O interface may be configured to use one or more display devices, such as the internal display 330 and/or external display 130, that are configured to present visible signals to a user. A visual I/O interface may be configured to use one or more CCDs 134 and/or other image capture devices to capture content, including reactions. Non-limiting examples include lenses, digital image capture and processing software and the like. Accordingly, it is to be appreciated that any existing or future arising visual I/O interfaces, devices, systems and/or components may be utilized by and/or in conjunction with a UD to facilitate the capture, communication and/or presentation of visual content (i.e., visible signals) during a Party.

In at least one implementation of the present disclosure, during a Party users may provide their comments and/or reactions visibly for presentation to other users and receive representations of other user's comments and/or reactions visibly using one or more visible signals provided with a content segment.

A method for implementing a Party may include querying a user of a UD 104 whether they desire to provide watch party content including reactions. If so, an identification and pairing operation may occur by which a first CCD 134 associated with the user is first identified and then paired to their UD. The method may further include querying as to whether the first user and/or a second user desires to provide second watch party content and reactions, such as second watch party content and reactions captured by a second CCD 134. If so, a second identification and pairing of the second CCD 134 with the given UD 104 occurs. When more than one CCD 134 is paired with a UD 104 during a Party, the process may further include determining whether a prioritization, a processing, or other operation is to be applied to watch party content segments and/or reactions received from a given CCD 134. The method may further include determining whether a given primary content, secondary content, reaction, KSC, DFSC, and/or other content is to be presented on one or more displays, in windows on a common display, have backgrounds modified or unmodified, or otherwise. The process may include replacing background images with a primary content. A method may include some, different and/or additional operations than those described above.

Although various implementations have been described above with a certain degree of particularity, or with reference to one or more individual implementations, those skilled in the art could make numerous alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings shall be interpreted as illustrative of implementations and not limiting. Changes in detail or structure may be made without departing from the basic elements of the present disclosure as defined in the following claims.

What is claimed is:

1. A system, facilitating a Deepfake content watch party (DFWP), comprising:
   a sync server;
   a Deepfake presenter user device (DFPUD) communicatively coupled to the sync server;
      wherein the DFPUD executes non-transient DFPUD computer instructions which instruct the DFPUD to perform DFPUD operations comprising:
         instructing a content capture device (CCD), communicatively coupled to the DFPUD, to capture a Deepfake Reaction (DFR) by a DFPUD user;
         receiving the DFR from the CCD; and
         communicating the DFR to the sync server;
   a Deepfake user device (DFUD) communicatively coupled to the sync server;
   a content provider, communicatively coupled to the DFPUD and the DFUD;
      wherein the content provider provides Deepfake Content (DFC) to the DFPUD and the DFUD and Deepfake Augmented Content (DFAC) to the sync server; and
      wherein the DFC includes a DFC segment that includes a Deepfake Target (DFT);
      wherein the DFAC includes secondary content which identifies the DFT by a Deepfake model;
      wherein the sync server executes non-transient server computer instructions which instruct the sync server to perform sync server operations comprising:
         receiving the DFR from the DFPUD;
         generating a Deepfake Subject (DFS) for the DFPUD user;
            wherein the DFS identifies at least one characteristic of the DFPUD user;
         generating from the DFR, using the DFS, Deepfake secondary content (DFSC); and
         communicating the DFSC to the DFUD; and
            wherein the DFUD integrates the DFSC with the DFC to facilitate presentation of DFRs in a DFWP;
         receiving Deepfake synchronization information (DFSI);
         communicating the DFSI to the DFUD;
            wherein the DFSI includes:
               a content timing information—primary (CTI-P) identifying when a first instance of the DFC segment is received by the DFPUD; and
               a content timing information—DFR (CTI-DFR) identifying when the DFPUD receives the DFR from the CCD; and
            instructing the DFUD to adjust presentation of a second instance of the DFC segment based the latter of the CTI-P and the CTI-DFR.

2. The system of claim 1,
wherein the DFSI facilitates synchronized presentation, by the DFUD, of the DFSC with the DFC segment.

3. The system of claim 1,
wherein the DFPUD operations further comprise:
   generating Deepfake synchronization information (DFSI); and
   communicating the DFSI to the sync server with the DFR; and
wherein the DFSI facilitates synchronization of the DFR with the DFC segment.

4. The system of claim 3,
wherein the sync server operations further comprise:
   communicating the DFAC to the DPFUD;
wherein the DFPUD operations further comprise:
   instructing the CCD to capture the DFR by the DFPUD user based upon the DFAC; and
wherein the DFSI further facilitates synchronization, by the sync server, of the DFR with the DFAC and the DFC segment.

5. The system of claim 4,
wherein the DFPUD operations further comprise:
   instructing the CCD to capture the DFR while presenting the DFAC corresponding to the DFC segment to the DFPUD user.

6. The system of claim 5,
wherein the content provider further comprises a content distribution network including a host content node and a client content node;
wherein host content node provides a first instance of the DFC segment to the DFPUD;
wherein the client content node provides a second instance of the DFC segment to the DFUD; and
wherein the sync server operations further comprise:
instructing the DFUD to adjust presentation of the second instance of the DFC segment based upon content timing information associated with when the DFPUD receives the first instance of the DFC segment.

7. The system of claim 1,
wherein the DFC comprises live content.

8. The system of claim 1,
wherein the adjusting of the presentation of the second instance of the DFC segment comprises applying, by the DFUD, a trick-play mode operation to first instance of the DFC segment.

9. The system of claim 8,
wherein the trick-play mode operation comprises one of a pause and a seek operation.

10. The system of claim 1,
wherein the sync server executes non-transient second server computer instructions which instruct the sync server to perform conferencing operations comprising:
determining a type of content provided by the DFR.

11. The system of claim 10,
wherein the type of the content provided by the DFR is at least one of an audible signal and a visible signal.

12. The system of claim 11,
wherein the conferencing operations further comprise:
identifying a user associated with the DFR; and
prioritizing the DFR based on the identification of the user.

13. The system of claim 12,
wherein the conferencing operations further comprise:
instructing the DFUD to present the DFSC during the DFWP.

14. The system of claim 13,
wherein the conferencing operations further comprise:
instructing the DFUD to not present the DFSC during the DFWP.

15. A method for facilitating Deepfake watch parties (DFWPs) comprising:
designating a first user device as a Deepfake Presenter User Device (DFPUD);
designating a second user device as a Deepfake User Device (DFUD);
communicatively coupling the DFPUD and the DFUD with a sync server;
receiving a first instance of a Deepfake Content (DFC) segment by the DFPUD;
receiving a second instance of the DFC segment by the DFUD;
determining a Content Timing Information-Primary (CTI-P);
wherein the CTI-P identifies when the first instance of the DFC segment is received by the DFPUD;
receiving a Deepfake Augmented Content (DFAC) segment by the sync server;
wherein the DFAC segment is associated with the DFC segment and identifies at least one Deepfake Target (DFT);
receiving a Deepfake Reaction (DFR) by the DFPUD;
wherein the DFR is a reaction by a DFPUD user to a presentation of the DFC segment to the DFPUD user;
determining a Content Timing Information-Deepfake Reaction (CTI-DFR) by the DFPUD;
communicating the DFR, the CTI-P, and the CTI-DFR to the sync server;
converting the DFR into Deepfake Secondary Content (DFSC);
communicating the DFSC from the sync server to the DFUD; and
instructing, by the sync server, the DFUD to delay presentation of the second instance of the DFC segment with the DFSC based on a delay determined from a time difference between the CTI-P and the CTI-DFR.

16. The method of claim 15,
wherein the DFAC provides a Deepfake model of the DFT; and
wherein the DFSC is generated by the sync server based on a Deepfake Subject (DFS) model for the DFPUD user;
wherein the DFS is generated using autoencoders and a neural network; and
wherein the DFR is adapted by the DFS to generate the DFSC; and
wherein the DFSC facilitates replacement of a representation of the DFT with a DFS modeled representation of the DFR in the second instance of the DFC segment as presented by the DFUD.

17. The method of claim 15,
wherein the DFSC is generated by the DFPUD based on a Deepfake Subject (DFS) associated with the DFPUD user.

18. A non-transitory computer readable medium, having stored thereon computer instructions which, when executed by a processor of a server, cause the server to perform operations comprising:
determining a delay period occurring between when a Deepfake Presenter User Device (DFPUD) receives a first instance of a Deepfake Content (DFC) segment and when the DFPUD receives a Deepfake Reaction (DFR) from a content capture device;
wherein the DFR is responsive to the DFC segment; and
communicating a Deepfake Secondary Content segment (DFSC) to a Deepfake User Device (DFUD);
receiving Deepfake synchronization information (DFSI);
communicating the DFSI to the DFUD;
wherein the DFSI includes:
a content timing information-primary (CTI-P) identifying when a first instance of the DFC segment is received by the DFPUD; and
a content timing information-DFR (CTI-DFR) identifying when the DFPUD receives the DFR from the CCD; and
instructing the DFUD to adjust presentation of a second instance of the DFC segment based the latter of the CTI-P and the CTI-DFR; and
wherein the DFSC includes a conversion of the DFR based on a model of a Deepfake Subject and the Deepfake Synchronization Information (DFSI) that configures the DFUD to synchronize presentation of a second instance of the DFC segment with the DFSC based upon a determined delay.

19. The non-transitory computer readable medium of claim 18, wherein the operations further comprise:

receiving Deepfake Augmented Content (DFAC) which identifies a Deepfake Target (DFT) in the DFC segment; and generating the DFSC based upon the DFR, a Deepfake Subject (DFS) model, and the DFT; and wherein the DFSC instructs the DFUD to further synchronize the presentation of the second instance of the DFC segment with the DFSC based upon the DFS model and the DFT.

\* \* \* \* \*